US012627123B2

(12) United States Patent
Xu et al.

(10) Patent No.: US 12,627,123 B2
(45) Date of Patent: May 12, 2026

(54) ELECTRIC PATROL INSPECTION CONTROL METHOD AND SYSTEM BASED ON UNMANNED AERIAL VEHICLE

(71) Applicant: Three Gorges Hi-Tech Information Technology Co., Ltd, Wuhan (CN)

(72) Inventors: Cheng Xu, Wuhan (CN); Yunsheng Xu, Wuhan (CN); Jun Tang, Wuhan (CN); Yu Xiao, Wuhan (CN); Xiaomi Zhu, Wuhan (CN); Xingchen Xiang, Wuhan (CN); Chengshi He, Wuhan (CN); Chen Li, Wuhan (CN)

(73) Assignee: Three Gorges Hi-Tech Information Technology Co., Ltd., Wuhan (CN)

( * ) Notice: Subject to any disclaimer, the term of this patent is extended or adjusted under 35 U.S.C. 154(b) by 121 days.

(21) Appl. No.: 18/892,049

(22) Filed: Sep. 20, 2024

(65) Prior Publication Data

US 2026/0095033 A1 Apr. 2, 2026

Related U.S. Application Data

(63) Continuation of application No. PCT/CN2024/108059, filed on Jul. 29, 2024.

(30) Foreign Application Priority Data

Apr. 12, 2024 (CN) .......................... 202410438837.8

(51) Int. Cl.
*H02G 1/02* (2006.01)
*G01S 17/89* (2020.01)
(Continued)

(52) U.S. Cl.
CPC .............. *H02G 1/02* (2013.01); *G01S 17/89* (2013.01); *G05D 1/6482* (2024.01);
(Continued)

(58) Field of Classification Search
CPC .. H02G 1/02; G06T 7/194; G06T 7/11; G06T 5/92; G06T 5/70; G06T 7/0002;
(Continued)

(56) References Cited

FOREIGN PATENT DOCUMENTS

| CN | 105868722 A | 8/2016 |
|---|---|---|
| CN | 114265418 A * | 4/2022 |

(Continued)

OTHER PUBLICATIONS

First Office Action issued in counterpart Chinese Patent Application No. 202410438837.8, dated May 18, 2024.

(Continued)

*Primary Examiner* — Hunter B Lonsberry
*Assistant Examiner* — Besufekad Lemma Tessema
(74) *Attorney, Agent, or Firm* — Westbridge IP LLC

(57) ABSTRACT

Disclosed are an electric patrol inspection control method and an electric patrol inspection control system based on an unmanned aerial vehicle. The method includes: formulating a flight path according to an electric patrol inspection area, collecting an image and position information, and transmitting the image and the position information to a receiving terminal of a ground station in a form of wireless transmission; obtaining analysis on defects, damages and corrosion of the electric device, processing and analyzing the image, and then obtaining analysis situations; and generating a patrol inspection electronic report, and at the same time, giving the service life, maintenance expense, maintenance measure of the electric device according to the patrol inspection electronic report, informing maintenance personnel of the position information of the electric device. The system includes an UAV control module, an image processing and analyzing module and a patrol and examine electronic reports generation module.

7 Claims, 9 Drawing Sheets

Formulate a flight path according to an electric patrol inspection area, collecting an image and position information of an electric device by a plurality of types of devices equipped on an unmanned aerial vehicle, and transmit the image and the position information to a receiving terminal of a ground station in a form of wireless transmission — S100

Receive, by the ground station, the real-time collected image and position information, process and analyze the image, and then obtain analysis situations such as a defect, damage and corrosion of the electric device — S200

Generate a patrol inspection electronic report including the analysis situations of a plurality of electric devices according to the analysis situation of the ground station and the position information as a distinguishing characteristic, at the same time, give the service life, maintenance expense, maintenance measure of the electric device according to the patrol inspection electronic report, and inform maintenance personnel of the position information of the electric device — S300

(51) Int. Cl.

| | | |
|---|---|---|
| *G05D 1/648* | (2024.01) | |
| *G05D 105/80* | (2024.01) | |
| *G06T 5/70* | (2024.01) | |
| *G06T 5/92* | (2024.01) | |
| *G06T 7/00* | (2017.01) | |
| *G06T 7/11* | (2017.01) | |
| *G06T 7/194* | (2017.01) | |
| *G06T 7/40* | (2017.01) | |

(52) U.S. Cl.
CPC ............. *G05D 1/6484* (2024.01); *G06T 5/70* (2024.01); *G06T 5/92* (2024.01); *G06T 7/0002* (2013.01); *G06T 7/11* (2017.01); *G06T 7/194* (2017.01); *G06T 7/40* (2013.01); *G05D 2105/89* (2024.01); *G06T 2207/10028* (2013.01); *G06T 2207/10032* (2013.01); *G06T 2207/20081* (2013.01); *G06T 2207/30184* (2013.01); *G06T 2207/30241* (2013.01); *G06T 2207/30252* (2013.01)

(58) Field of Classification Search
CPC ...... G06T 7/40; G05D 1/6482; G05D 1/6484; G05D 2105/89; G01S 17/89
See application file for complete search history.

(56) References Cited

FOREIGN PATENT DOCUMENTS

| | | | | | |
|---|---|---|---|---|---|
| CN | 116052481 | A | * | 5/2023 | ............... G08G 5/76 |
| CN | 116070811 | A | | 5/2023 | |
| CN | 116301055 | A | | 6/2023 | |
| CN | 117291911 | A | | 12/2023 | |
| CN | 116301055 | B | * | 6/2024 | ............ G05D 1/101 |
| JP | 2000216979 | A | | 8/2000 | |

OTHER PUBLICATIONS

Notification to Grant Patent Right for Invention issued in counterpart Chinese Patent Application No. 202410438837.8, dated Jun. 7, 2024.

* cited by examiner

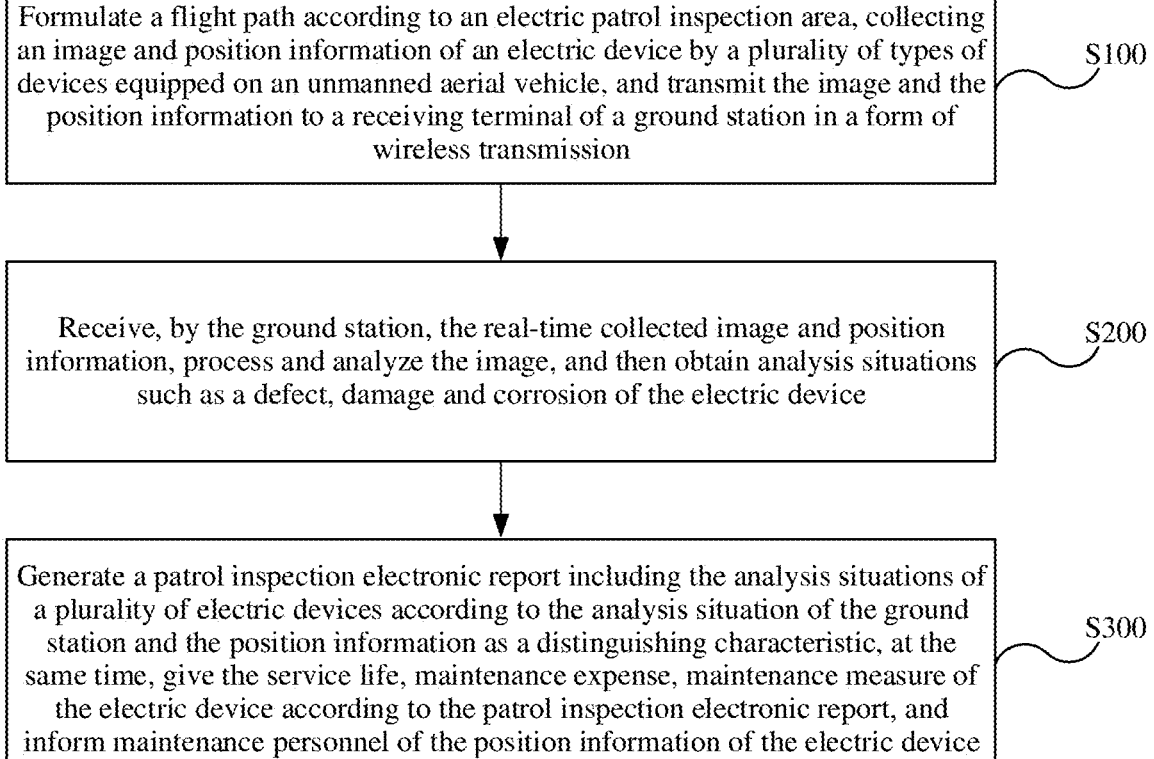

Formulate a flight path according to an electric patrol inspection area, collecting an image and position information of an electric device by a plurality of types of devices equipped on an unmanned aerial vehicle, and transmit the image and the position information to a receiving terminal of a ground station in a form of wireless transmission ⟩ S100

Receive, by the ground station, the real-time collected image and position information, process and analyze the image, and then obtain analysis situations such as a defect, damage and corrosion of the electric device ⟩ S200

Generate a patrol inspection electronic report including the analysis situations of a plurality of electric devices according to the analysis situation of the ground station and the position information as a distinguishing characteristic, at the same time, give the service life, maintenance expense, maintenance measure of the electric device according to the patrol inspection electronic report, and inform maintenance personnel of the position information of the electric device ⟩ S300

FIG. 1

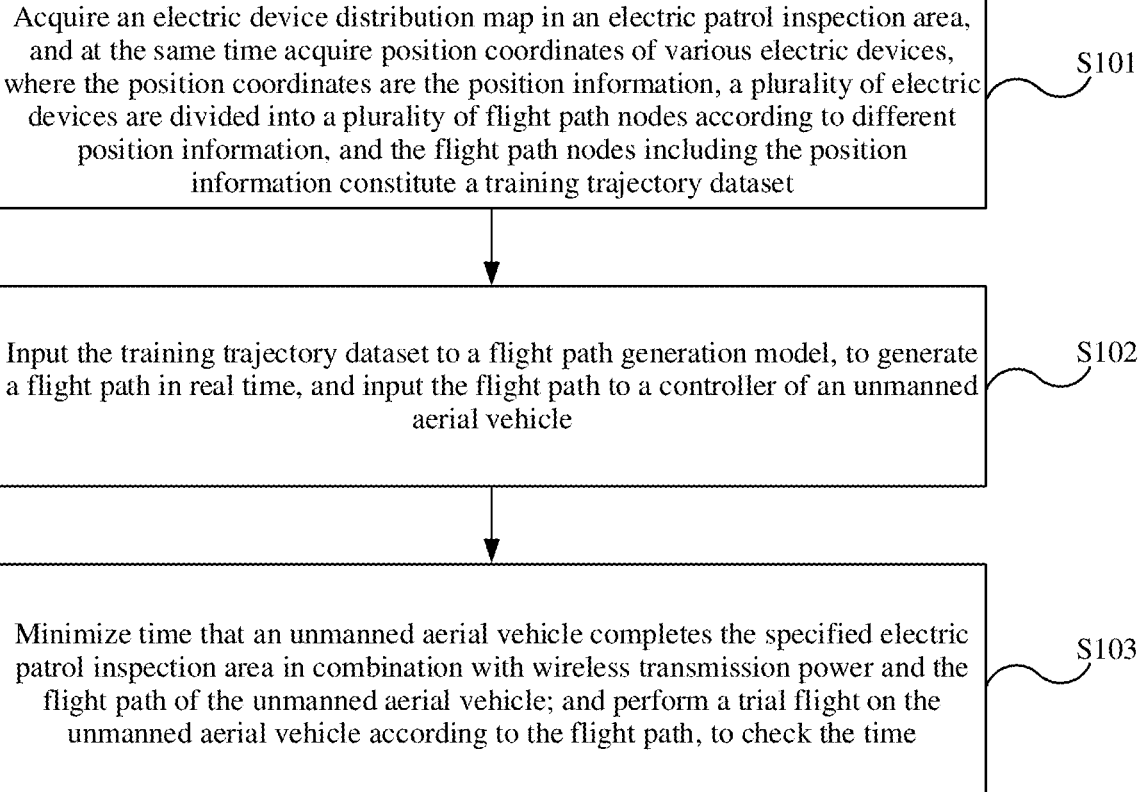

Acquire an electric device distribution map in an electric patrol inspection area, and at the same time acquire position coordinates of various electric devices, where the position coordinates are the position information, a plurality of electric devices are divided into a plurality of flight path nodes according to different position information, and the flight path nodes including the position information constitute a training trajectory dataset — S101

Input the training trajectory dataset to a flight path generation model, to generate a flight path in real time, and input the flight path to a controller of an unmanned aerial vehicle — S102

Minimize time that an unmanned aerial vehicle completes the specified electric patrol inspection area in combination with wireless transmission power and the flight path of the unmanned aerial vehicle; and perform a trial flight on the unmanned aerial vehicle according to the flight path, to check the time — S103

FIG. 2

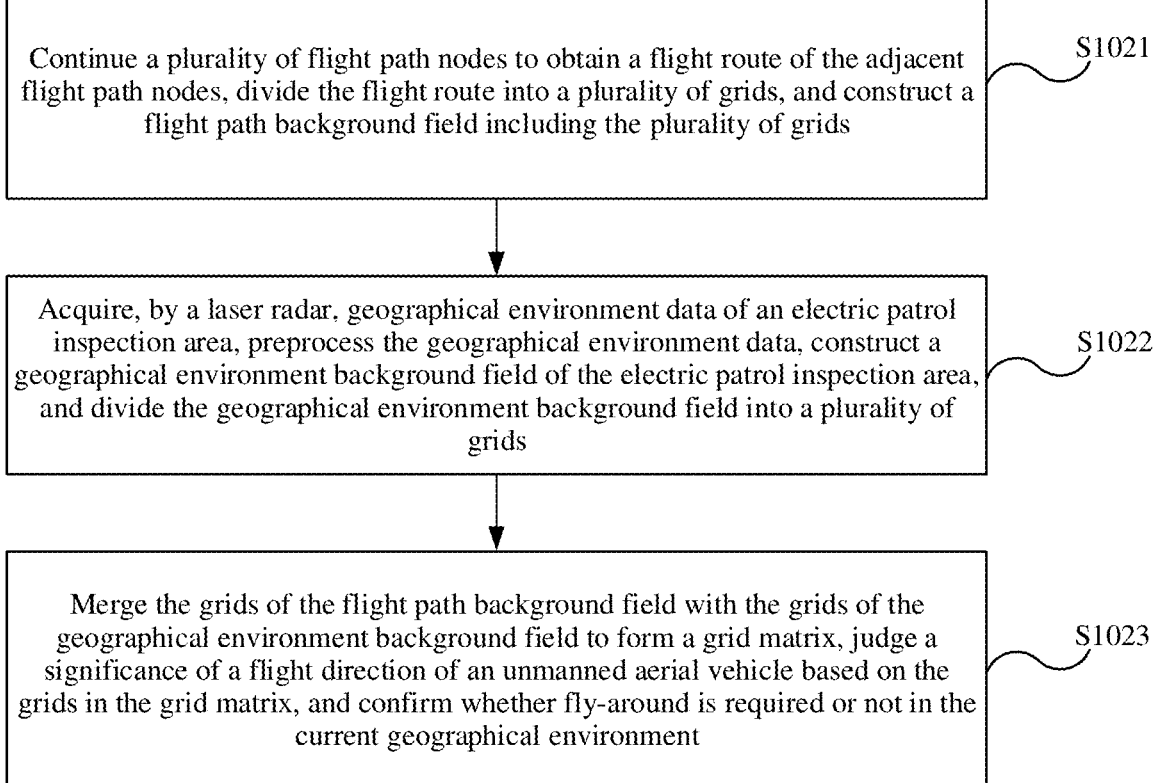

Continue a plurality of flight path nodes to obtain a flight route of the adjacent flight path nodes, divide the flight route into a plurality of grids, and construct a flight path background field including the plurality of grids

S1021

Acquire, by a laser radar, geographical environment data of an electric patrol inspection area, preprocess the geographical environment data, construct a geographical environment background field of the electric patrol inspection area, and divide the geographical environment background field into a plurality of grids

S1022

Merge the grids of the flight path background field with the grids of the geographical environment background field to form a grid matrix, judge a significance of a flight direction of an unmanned aerial vehicle based on the grids in the grid matrix, and confirm whether fly-around is required or not in the current geographical environment

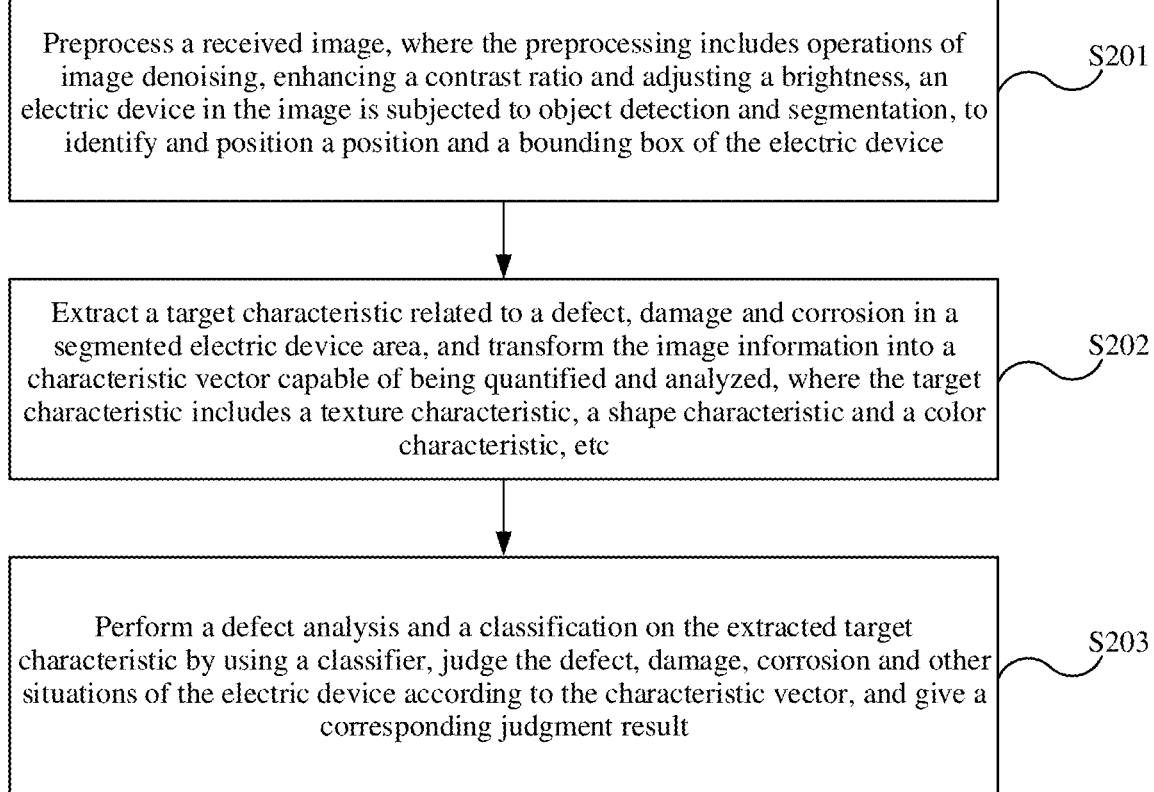

Preprocess a received image, where the preprocessing includes operations of image denoising, enhancing a contrast ratio and adjusting a brightness, an electric device in the image is subjected to object detection and segmentation, to identify and position a position and a bounding box of the electric device    S201

Extract a target characteristic related to a defect, damage and corrosion in a segmented electric device area, and transform the image information into a characteristic vector capable of being quantified and analyzed, where the target characteristic includes a texture characteristic, a shape characteristic and a color characteristic, etc    S202

Perform a defect analysis and a classification on the extracted target characteristic by using a classifier, judge the defect, damage, corrosion and other situations of the electric device according to the characteristic vector, and give a corresponding judgment result    S203

FIG. 5

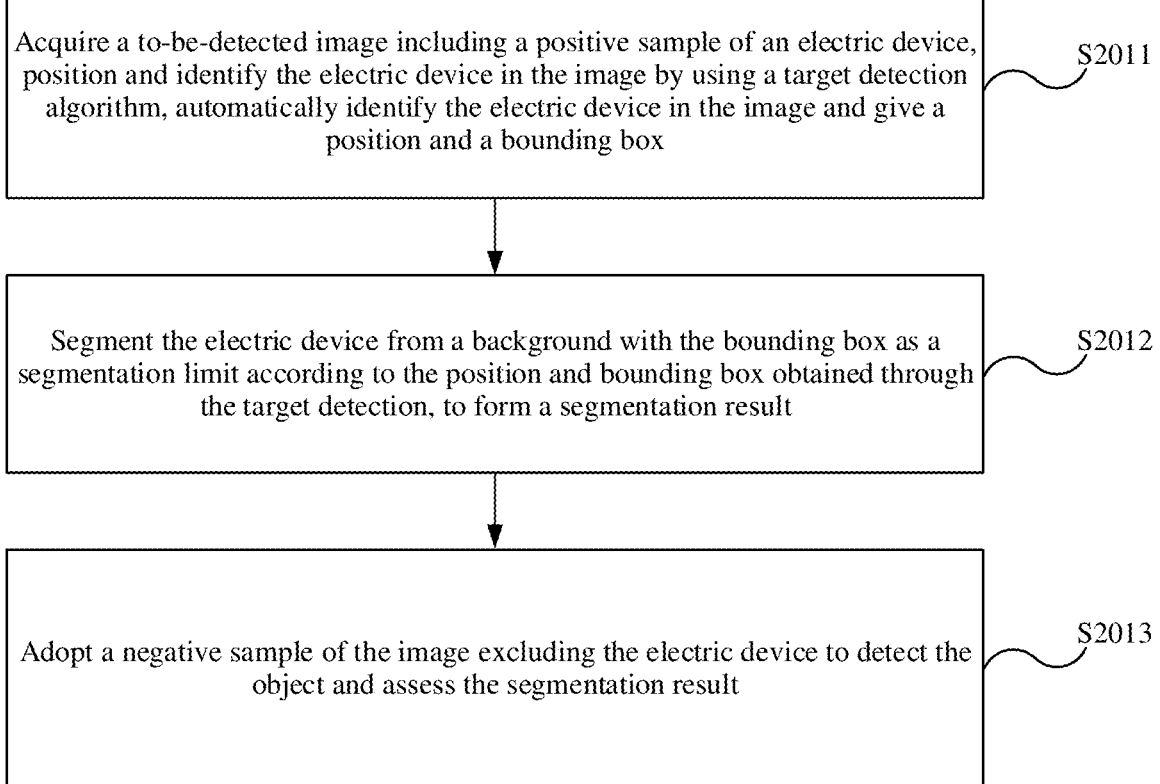

Acquire a to-be-detected image including a positive sample of an electric device, position and identify the electric device in the image by using a target detection algorithm, automatically identify the electric device in the image and give a position and a bounding box

S2011

Segment the electric device from a background with the bounding box as a segmentation limit according to the position and bounding box obtained through the target detection, to form a segmentation result

S2012

Adopt a negative sample of the image excluding the electric device to detect the object and assess the segmentation result

Figure 7:
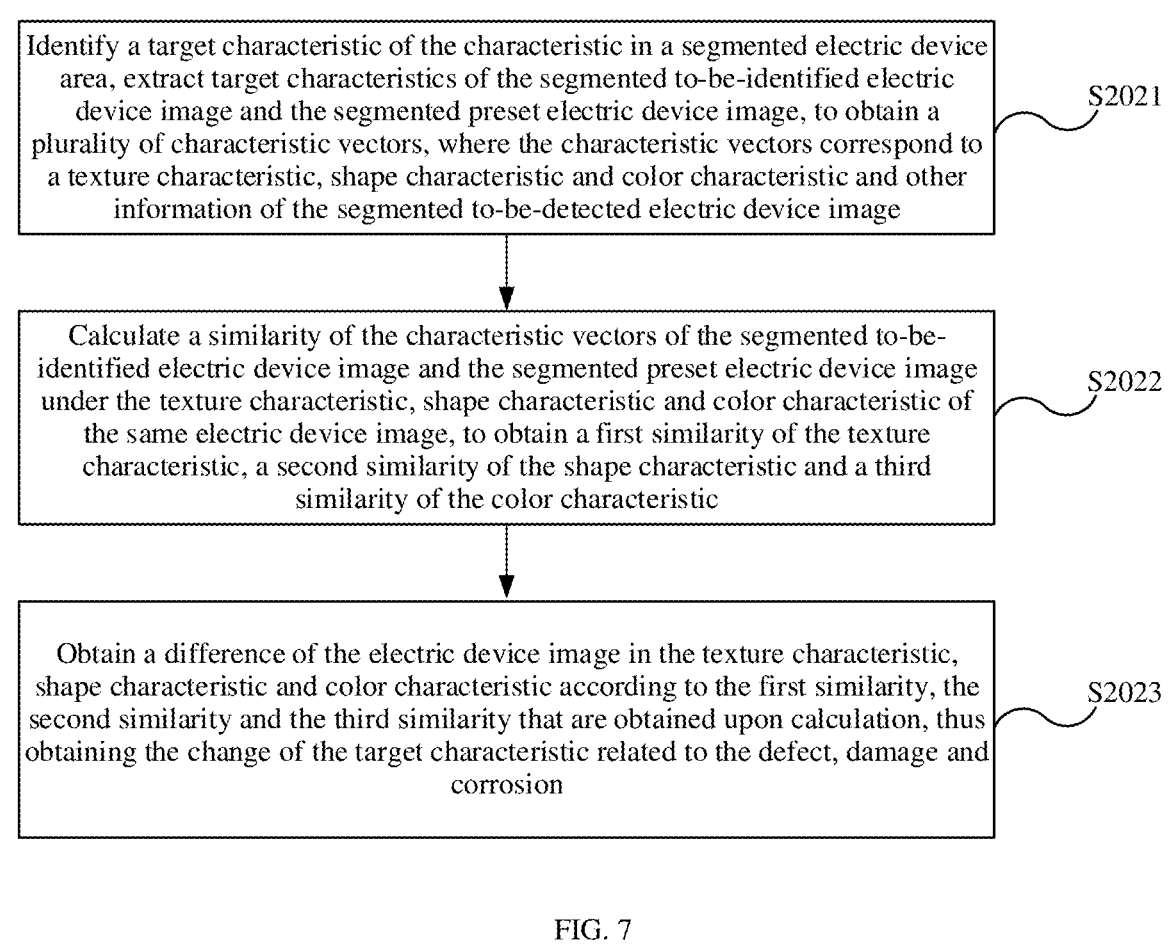

Identify a target characteristic of the characteristic in a segmented electric device area, extract target characteristics of the segmented to-be-identified electric device image and the segmented preset electric device image, to obtain a plurality of characteristic vectors, where the characteristic vectors correspond to a texture characteristic, shape characteristic and color characteristic and other information of the segmented to-be-detected electric device image

S2021

Calculate a similarity of the characteristic vectors of the segmented to-be-identified electric device image and the segmented preset electric device image under the texture characteristic, shape characteristic and color characteristic of the same electric device image, to obtain a first similarity of the texture characteristic, a second similarity of the shape characteristic and a third similarity of the color characteristic

S2022

Obtain a difference of the electric device image in the texture characteristic, shape characteristic and color characteristic according to the first similarity, the second similarity and the third similarity that are obtained upon calculation, thus obtaining the change of the target characteristic related to the defect, damage and corrosion

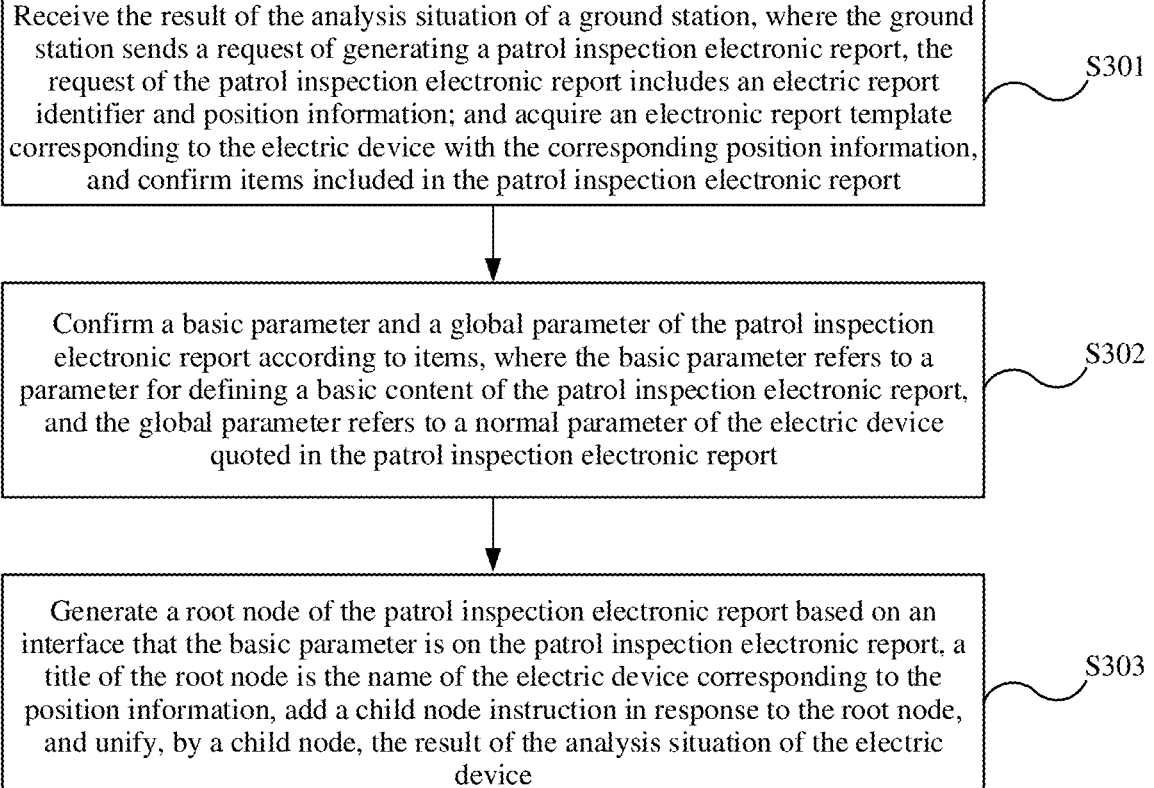

Receive the result of the analysis situation of a ground station, where the ground station sends a request of generating a patrol inspection electronic report, the request of the patrol inspection electronic report includes an electric report identifier and position information; and acquire an electronic report template corresponding to the electric device with the corresponding position information, and confirm items included in the patrol inspection electronic report

S301

Confirm a basic parameter and a global parameter of the patrol inspection electronic report according to items, where the basic parameter refers to a parameter for defining a basic content of the patrol inspection electronic report, and the global parameter refers to a normal parameter of the electric device quoted in the patrol inspection electronic report

S302

Generate a root node of the patrol inspection electronic report based on an interface that the basic parameter is on the patrol inspection electronic report, a title of the root node is the name of the electric device corresponding to the position information, add a child node instruction in response to the root node, and unify, by a child node, the result of the analysis situation of the electric device

ELECTRIC PATROL INSPECTION CONTROL METHOD AND SYSTEM BASED ON UNMANNED AERIAL VEHICLE

CROSS-REFERENCE TO RELATED APPLICATION

This application is a continuation of International Application No. PCT/CN2024/108059, filed on Jul. 29, 2024, which claims priority to Chinese Patent Application No. 202410438837.8, filed on Apr. 12, 2024. All of the aforementioned applications are incorporated herein by reference in their entireties.

TECHNICAL FIELD

The present disclosure relates to the technical field of remote monitoring of power facilities, and in particular to an electric patrol inspection control method and an electric patrol inspection control system based on an unmanned aerial vehicle.

BACKGROUND

Power facilities refer to various devices and facilities used to generate, transmit and distribute electricity, including a power station, an electric transmission line, a transformer substation, a power distribution network and the like. They are the basis of energy supply and electric system operation, and crucial to guarantee the normal operation of the modern society. The importance is mainly reflected in the following aspects: energy supply: the power facilities are important infrastructures for providing electric energy, and supply power to various industries, families and public institutions, to support economic and social development. Economic development: the construction and operation of the power facilities promote the economic growth, provide reliable power supply to industrial production, commercial operation and service industries, and promote the development of economic activities. Life convenience: the popularization of the power facilities enables people's life to be more convenient, supports the normal operation of families, businesses and social facilities, and provides basic services such as lighting, heating and communication.

At the same time, the application of new technologies will promote the intelligent and automation development of the power facilities, such as artificial intelligence, Internet of Things and big data analysis, thus improving the device operation and maintenance efficiency and system operation reliability. With the rise of distributed energy systems, the power facilities will pay more attention to flexibility and sustainability, including a small solar panel, a wind turbine and the like, to achieve more reliable and sustainable energy supply. As the energy storage technology makes a progress, the power facilities will better respond to an energy fluctuation and a peak-valley difference, to provide a stable power supply.

With the continuous increase and decentralization of the power facilities, the traditional manual patrol inspection becomes more and more difficult and inefficient; patrol inspection personnel manually record line defects on paper at the site, then the line defects are counted manually, and this working way exists the following obvious defects: 1. Scientific supervision and examination means are lack for the field patrol inspection personnel. Management personnel cannot examine whether or not the patrol inspection personnel reach each pole tower and check the device that should be checked carefully, therefore a situation of missing inspection for the pole tower and other devices on the electric transmission line, caused by lacking a sense of responsibility of the patrol inspection personnel, exists, and the patrol inspection quality is difficult to be ensured. 2. The personnel quality is an important factor affecting the patrol inspection quality. The respective knowledge and experience accumulated of the patrol inspection personnel are uneven, each person has different understandings on devices and items that should be checked, and therefore the inspection quality may be greatly different from the field inspection record. 3. The patrol inspection data is saved in a paper form, existing difficult statistics and inquiry. A great number of inspection records will generate after each patrol inspection, the workload to collect, summarize, analyze and count these recorded data is considerable, and the paper data has shortcomings of more difficult long-term storage and easy missing. 4. By checking the inspection record only, the operation and management personnel are difficult to evaluate the working quality and quantity of the patrol inspection personnel accurately and qualitatively. 5. Error and omission frequently occur due to the manual management for the power transmission and distribution power data. It is inconvenient to inquire data manually, and takes a lot of work and time to count the statement. Since the patrol inspection method for the traditional power transmission line exists shortcomings such as more human factors, high management cost and incapability of monitoring the working state of the patrol inspection personnel, developing an efficient, real-time and intelligent patrol inspection system is of great important practical significance to improve the scientific management level of the patrol inspection work of the power transmission line, effectively supervise the work of the patrol inspection personnel, prevent the occurrence of inadequate patrol inspections, perform centralized digital unified management and statistical analysis on the patrol inspection data, and implement the electronization, informatization and intelligentization of the patrol inspection work.

Prior art I, Chinese Patent Application Publication No. CN116667201A discloses an electric patrol inspection device with an ice-breaking structure, including an electric patrol inspection vehicle, where a bottom of the electric patrol inspection vehicle is hinged with axes of vehicle wheels, an interior of the electric patrol inspection vehicle is fixedly connected with a top side of a longitudinal motor, an output end of the longitudinal motor is fixedly connected with one end of a threaded rod, and a thread place of the threaded rod is in threaded connection with a thread place of a longitudinal threaded bushing. Although positions of two groups of ice-breaking plates can be raised and reduced through the longitudinal motor, bottoms of the ice-breaking plates may fit with the ground all the time, to avoid incomplete ice breaking caused by the uneven ground, and then the electric patrol inspection vehicle still drives on an ice surface, causing the electric patrol inspection vehicle to slip or an obstacle avoidance sensor to break down, and causing obstacle avoidance functions to be invalid, the function thereof is relatively simple, only involving in an ice-breaking function, and not performing an all-around inspection on the electric device, thus causing a poor patrol inspection effect.

Prior art II, Chinese Patent Application Publication No. CN116667220A discloses an efficient operation electric patrol inspection system, including a dispatching platform, a patrol inspection unmanned aerial vehicle, a maintenance distribution unit and a scoring module, where the dispatching platform remotely controls the patrol inspection unmanned aerial vehicle to inspect an electric device through 5G (5-Generation), and the dispatching platform manages and runs the maintenance distribution unit through personnel. According to the efficient operation electric patrol inspection system, the dispatching platform remotely controls the patrol inspection unmanned aerial vehicle to achieve a regular daily patrol inspection on electric lines and devices; meanwhile when the existence of accidents, hidden dangers or exceptions in a designated area is monitored, although assigning tasks of different difficult levels to inspection personnel with different scores is ensured by combining a difficult level dividing module with a scoring module, and the scoring module achieves data updating by the change of internal and external feedback modules, the scores of the inspection personnel may be adjusted, the maintenance efficiency of the actual electric patrol inspection task can be improved, such that the electric patrol inspection system runs efficiently; and however lacking the ability of discovering problems and exceptions leads to a one-sided analysis result.

Prior art III, Chinese Patent Application Publication No. CN117007046A discloses a path planning method and system for an electric patrol inspection robot, including: acquiring a to-be-inspected electric line path trajectory of the electric patrol inspection robot, and performing path planning for the electric patrol inspection robot according to the acquired electric line path trajectory and a preset path planning model, where the preset path planning model adopts an improved sparrow search algorithm, although tent mapping is adopted for global disturbance of the sparrow search algorithm to calculate search factors and implement the path optimization for the patrol inspection electric line of the electric patrol inspection robot, the robot has a limited action scope, specifically the robot cannot perform patrol inspection efficiently in complex road conditions, mountainous areas and other places.

Currently, the prior arts I, II and III exist problems of a relatively low intelligent level of the electric patrol inspection, not implementing the patrol inspection efficiently and accurately and leading to a relatively great error of a patrol inspection result, so the present disclosure provides an electric patrol inspection control method and system based on an unmanned aerial vehicle, mainly including technologies such as the unmanned aerial vehicle, image processing and computation, data storage and transmission; functions such as quick patrol inspection, exception detection and positioning to the power facilities are achieved by the unmanned aerial vehicle equipped with a plurality of devices such as a high-definition camera, a thermal camera and a laser radar; and collected image data is analyzed by the image processing technology, to discover the defect, damage, corrosion and other situations of the device, predict the service life and maintenance expense of the device, generate a patrol inspection report in time, and improve the equipment reliability and safety.

SUMMARY

To solve the foregoing technical problem, the present disclosure provides an electric patrol inspection control method based on an unmanned aerial vehicle, including the following steps of:

formulating a flight path according to an electric patrol inspection area, collecting an image and position information of an electric device by a plurality of types of devices equipped on the unmanned aerial vehicle, and transmitting the image and the position information to a receiving terminal of a ground station in a form of wireless transmission;

receiving, by the ground station, the real-time collected image and position information, processing and analyzing the image, and then obtaining analysis on defects, damages and corrosion of the electric device; and generating a patrol inspection electronic report including the analysis situations of a plurality of electric devices according to the analysis situation of the ground station and the position information as a distinguishing characteristic.

Preferably, the device includes a high-definition camera, a thermal camera and a laser radar.

Preferably, a process of formulating the flight path for the electric patrol inspection area includes the following steps of:

acquiring an electric device distribution map in the electric patrol inspection area, and at the same time acquiring position coordinates of various electric devices, to constitute a training trajectory dataset;

inputting the training trajectory dataset to a flight path generation model, to generate a flight path in real time, and inputting the flight path to a controller of the unmanned aerial vehicle; and minimizing time that the unmanned aerial vehicle completes the specified electric patrol inspection area in combination with wireless transmission power and the flight path of the unmanned aerial vehicle; and performing a trial flight on the unmanned aerial vehicle according to the flight path, to check the time.

Preferably, the position coordinates are the position information, the plurality of electric devices are divided into a plurality of flight path nodes according to the different position information, and the flight path nodes including the position information constitute the training trajectory dataset.

Preferably, a process of generating the flight path includes the following steps of:

continuing the plurality of flight path nodes to obtain a flight route of the adjacent flight path nodes, dividing the flight route into a plurality of grids, and constructing a flight path background field including the plurality of grids;

acquiring, by the laser radar, geographical environment data of the electric patrol inspection area, preprocessing the geographical environment data, constructing a geographical environment background field of the electric patrol inspection area, and dividing the geographical environment background field into a plurality of grids; and merging the grids of the flight path background field with the grids of the geographical environment background field to form a grid matrix, judging a significance of a flight direction of the unmanned aerial vehicle based on the grids in the grid matrix, and confirming whether fly-around is required or not in the current geographical environment.

Preferably, a process of generating the patrol inspection electronic report includes the following steps of:

receiving a result of the analysis situation of the ground station, sending, by the ground station, a request of generating the patrol inspection electronic report, acquiring an electronic report template corresponding to the electric device with the corresponding position information, and confirming items included in the patrol inspection electronic report, where the request of the patrol inspection electronic report includes an electric report identifier and position information;

confirming a basic parameter and a global parameter of the patrol inspection electronic report according to the items, where the basic parameter refers to a parameter for defining a basic content of the patrol inspection electronic report, and the global parameter refers to a normal parameter of the electric device quoted in the patrol inspection electronic report; and generating a root node of the patrol inspection electronic report based on an interface that the basic parameter is on the patrol inspection electronic report, a title of the root node being the name of the electric device corresponding to the position information, adding a child node instruction in response to the root node, and unifying, by a child node, the result of the analysis situation of the electric device.

Preferably, the service life, maintenance expense, maintenance measure of the electric device are given at the same time according to the patrol inspection electronic report, and maintenance personnel are informed of the position information of the electric device.

The present disclosure provides an electric patrol inspection control system based on an unmanned aerial vehicle, including:

an unmanned aerial vehicle control module, configured to formulate a flight path according to an electric patrol inspection area, and to collect an image and position information of an electric device by a plurality of types of devices equipped on the unmanned aerial vehicle, where the image and the position information are transmitted to a receiving terminal of a ground station in a form of wireless transmission;

an image processing and analyzing module, configured to receive the real-time collected image and position information by the ground station, to process and analyze the image, and then to obtain analysis on defects, damages and corrosion of the electric device; and a patrol and examine electronic reports generation module, configured to generate a patrol inspection electronic report including the analysis situations of a plurality of electric devices according to the analysis situation of the ground station and the position information as a distinguishing characteristic, to give the service life, maintenance expense, maintenance measure of the electric device at the same time according to the patrol inspection electronic report, and to inform maintenance personnel of the position information of the electric device.

Preferably, the unmanned aerial vehicle control module includes:

a position information acquisition submodule, configured to acquire an electric device distribution map in the electric patrol inspection area, and at the same time to acquire position coordinates of various electric devices, where the position coordinates are the position information, the plurality of electric devices are divided into a plurality of flight path nodes according to the different position information, and the flight path nodes including the position information constitute a training trajectory dataset;

a flight path generation submodule, configured to input the training trajectory dataset to a flight path generation model, to generate the flight path in real time, and to input the flight path to a controller of the unmanned aerial vehicle;

a patrol inspection time minimization submodule, configured to minimize time that the unmanned aerial vehicle completes the specified electric patrol inspection area in combination with wireless transmission power and the flight path of the unmanned aerial vehicle, where a trial flight is performed on the unmanned aerial vehicle according to the flight path, to check the time;

a first background field formation submodule, configured to continue the plurality of flight path nodes to obtain a flight route of the adjacent flight path nodes, to divide the flight route into a plurality of grids, and to construct a flight path background field including the plurality of grids;

a second background field formation submodule, configured to acquire geographical environment data of the electric patrol inspection area by the laser radar, to preprocess the geographical environment data, to construct a geographical environment background field of the electric patrol inspection area, and to divide the geographical environment background field into a plurality of grids; and a fly-around judgment submodule, configured to merge the grids of the flight path background field with the grids of the geographical environment background field to form a grid matrix, to judge a significance of a flight direction of the unmanned aerial vehicle based on the grids in the grid matrix, and to confirm whether fly-around is required or not in the current geographical environment.

Preferably, the patrol and examine electronic reports generation module includes:

a report generation request submodule, configured to receive a result of the analysis situation of the ground station, where the ground station sends a request of generating the patrol inspection electronic report, the request of the patrol inspection electronic report includes an electric report identifier and position information; and to acquire an electronic report template corresponding to the electric device with the corresponding position information, and to confirm items included in the patrol inspection electronic report;

a parameter definition submodule, configured to confirm a basic parameter and a global parameter of the patrol inspection electronic report according to the items, where the basic parameter refers to a parameter for defining a basic content of the patrol inspection electronic report, and the global parameter refers to a normal parameter of the electric device quoted in the patrol inspection electronic report; and a demarcation definition submodule, configured to generate a root node of the patrol inspection electronic report based on an interface that the basic parameter is on the patrol inspection electronic report, where a title of the root node is the name of the electric device corresponding to the position information, a child node instruction is added in response to the root node, and a child node unifies the result of the analysis situation of the electric device.

In the present disclosure, first the flight path is formulated according to the electric patrol inspection area, the image and the position information of the electric device are collected by a plurality of types of devices equipped on the unmanned aerial vehicle, and the image and the position information are transmitted to the receiving terminal of the ground station in a form of wireless transmission; then the ground station receives the real-time collected image and position information, the image is processed and analyzed, and then the analysis situations such as the defect, damage and corrosion of the electric device are obtained; finally the patrol inspection electronic report including the analysis situations of a plurality of electric devices is generated according to the analysis situation of the ground station and the position information as the distinguishing characteristic; and the service life, maintenance expense, maintenance measure of the electric device are given at the same time at the same time according to the patrol inspection electronic report, and the maintenance personnel are informed of the position information of the electric device. The significance that the above-mentioned solution adopts the unmanned aerial vehicle for electric device patrol inspection is mainly reflected in the following aspects: improve the efficiency and accuracy: the patrol inspection performed by the unmanned aerial vehicle may implement the quick, efficient and complete inspection for the electric device. The unmanned aerial vehicle can cover a great area of patrol inspection area in a relatively short time, thus reducing the need for human resources and the patrol inspection time. Meanwhile, the plurality of devices equipped on the unmanned aerial vehicle can collect high-definition images and position information, and the defect, damage, corrosion and other issues of the electric device can be accurately identified through the image processing and analysis algorithm, thus improving the accuracy of the patrol inspection. Improve the safety: the personnel need to enter the high-voltage and dangerous working environment for the patrol inspection of the traditional electric device, thus existing a safety risk. However, the patrol inspection by the unmanned aerial vehicle can avoid the direct contact between the personnel and a high-voltage device, so as to reduce the personal safety risk. At the same time, the unmanned aerial vehicle can fly under complicated topographic conditions, and perform the patrol inspection better in places hard to reach, such as high altitudes and steep mountains, thus improving the patrol inspection safety. Save costs: compared with the traditional manual patrol inspection, the patrol inspection by the unmanned aerial vehicle can save human resources and time costs. In addition, the issues of the electric device can be discovered early in time by the patrol inspection by the unmanned aerial vehicle, so as to take the maintenance measure in advance and avoid the expansion and delay of device faults, thus reducing the maintenance expense and maintenance time, and saving the maintenance cost. Real-time monitoring and report generation: the image and the position information of the electric device can be acquired in real time by the patrol inspection by the unmanned aerial vehicle, and the analysis situations such as the defect, damage and corrosion of the electric device can be obtained in time through the image processing and analysis of the ground station. The patrol inspection electronic report is generated based on these analysis results, and the service life, maintenance expense, maintenance measure and other information of the electric device are provided, thus providing guidance and decision basis to the maintenance personnel.

Other features and advantages of the present disclosure will be explained in the following specification, and some will be apparent in the specification or be understood through implementing the present disclosure. The purpose and other advantages of the present disclosure may be implemented and obtained through the structure specially pointed out in the specification, claims and drawings.

The technical solution of the present disclosure is further described in detail below in combination with the drawings and the embodiments.

BRIEF DESCRIPTION OF THE DRAWINGS

The drawings are used to provide a further understanding of the present disclosure, and constitute a part of the specification, which is used to explain the present disclosure together with the embodiments of the present disclosure, but do not constitute limitations to the present disclosure.

FIG. 1 is a flowchart of an electric patrol inspection control method based on an unmanned aerial vehicle in Embodiment 1 of the present disclosure.

FIG. 2 is a process diagram of a flight path formulated for an electric patrol inspection area in Embodiment 2 of the present disclosure.

FIG. 3 is a process diagram of generating a flight path in Embodiment 3 of the present disclosure.

FIG. 5 is a process diagram of processing and analyzing an image in Embodiment 5 of the present disclosure.

FIG. 6 is a process diagram of performing object detection and segmentation on an electric device in an image in Embodiment 6 of the present disclosure.

FIG. 7 is a process diagram of extracting a target characteristic related to a defect, damage and corrosion in Embodiment 7 of the present disclosure.

FIG. 8 is a process diagram of generating a patrol inspection electronic report in Embodiment 8 of the present disclosure.

DETAILED DESCRIPTION OF THE EMBODIMENTS

Figure 4:
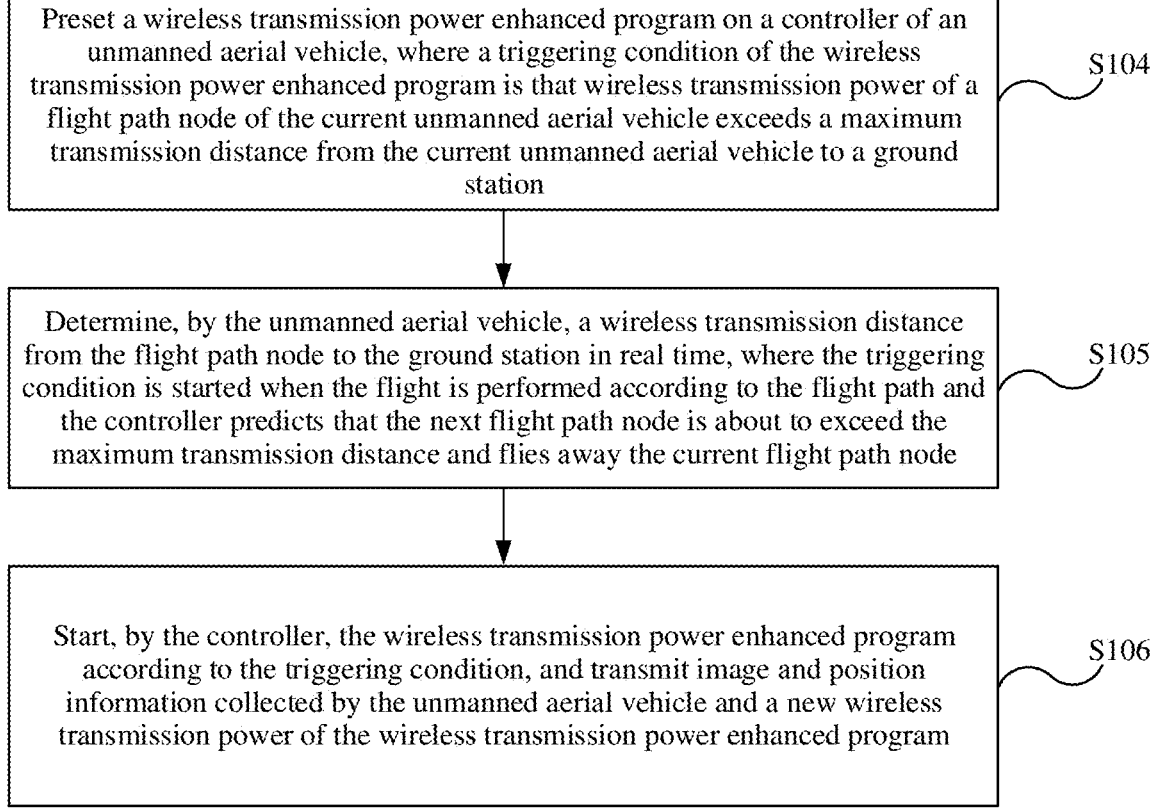
FIG. 4 is a process diagram of a wireless transmission image and position information in Embodiment 4 of the present disclosure.

The preferred embodiments of the present disclosure are described below in combination with drawings. It is understood that the preferred embodiments described herein are merely used for describing and explaining the present disclosure, instead of limiting the present disclosure.

Terms used in the embodiments of this application are only for the purpose of describing specific embodiments and not intended to limit the embodiments of this application. Singular forms "a/an", "said", and "the" in the embodiments of this application and the attached claims are also intended to include the plural forms, unless otherwise specified in the context. It is also understood that term "and/or" used herein includes one or any and all combinations of multiple related items which are listed.

Unless otherwise indicated, where the following descriptions relate to drawings, the same numbers in different drawings indicate the same or similar elements. The implementation mode described in the following exemplary embodiments do not represent all implementation modes consistent with this application. Instead, they are merely examples of devices and methods consistent with some aspects of this application as detailed in the attached claims. In the description of this application, it is to be understood that terms "first", "second", "third" and the like are merely used to distinguish between similar objects, and do not need to be used to describe a specific order or sequence, also are understood as indicating or implying relative importance. Those of ordinary skill in the art may understand the specific meaning of the terms in the disclosure according to specific conditions.

Embodiment 1: as shown in FIG. 1, the embodiment of the present disclosure provides an electric patrol inspection control method based on an unmanned aerial vehicle, including the following steps of:

S100: formulating a flight path according to an electric patrol inspection area, collecting an image and position information of an electric device by a plurality of types of devices equipped on the unmanned aerial vehicle, and transmitting the image and the position information to a receiving terminal of a ground station in a form of wireless transmission;

S200: receiving, by the ground station, the real-time collected image and position information, processing and analyzing the image, and then obtaining analysis situations such as a defect, damage and corrosion of the electric device; and S300: generating a patrol inspection electronic report including the analysis situations of a plurality of electric devices according to the analysis situation of the ground station and the position information as a distinguishing characteristic, giving the service life, maintenance expense, maintenance measure of the electric device at the same time according to the patrol inspection electronic report, and informing maintenance personnel of the position information of the electric device.

The above-mentioned technical solution has the following working principles and beneficial effects: in this embodiment, first the flight path is formulated according to the electric patrol inspection area, the image and the position information of the electric device are collected by a plurality of types of devices equipped on the unmanned aerial vehicle, and the image and the position information are transmitted to the receiving terminal of the ground station in a form of wireless transmission; then the ground station receives the real-time collected image and position information, the image is processed and analyzed, and then the analysis situations such as the defect, damage and corrosion of the electric device are obtained; finally the patrol inspection electronic report including the analysis situations of a plurality of electric devices is generated according to the analysis situation of the ground station and the position information as the distinguishing characteristic; and the service life, maintenance expense, maintenance measure of the electric device are given at the same time according to the patrol inspection electronic report, and the maintenance personnel are informed of the position information of the electric device. The significance that the above-mentioned solution adopts the unmanned aerial vehicle for electric device patrol inspection is mainly reflected in the following aspects: improve the efficiency and accuracy: the patrol inspection performed by the unmanned aerial vehicle may implement the quick, efficient and complete inspection for the electric device. The unmanned aerial vehicle can cover a great area of patrol inspection area in a relatively short time, thus reducing the need for human resources and the patrol inspection time. Meanwhile, the plurality of devices equipped on the unmanned aerial vehicle can collect high-definition images and position information, and the defect, damage, corrosion and other issues of the electric device can be accurately identified through the image processing and analysis algorithm, thus improving the accuracy of the patrol inspection. Improve the safety: the personnel need to enter the high-voltage and dangerous working environment for the patrol inspection of the traditional electric device, thus existing a safety risk. However, the patrol inspection by the unmanned aerial vehicle can avoid the direct contact between the personnel and a high-voltage device, so as to reduce the personal safety risk. At the same time, the unmanned aerial vehicle can fly under complicated topographic conditions, and perform the patrol inspection better in places hard to reach, such as high altitudes and steep mountains, thus improving the patrol inspection safety. Save costs: compared with the traditional manual patrol inspection, the patrol inspection by the unmanned aerial vehicle can save human resources and time costs. In addition, the issues of the electric device can be discovered early in time by the patrol inspection by the unmanned aerial vehicle, so as to take the maintenance measure in advance and avoid the expansion and delay of device faults, thus reducing the maintenance expense and maintenance time, and saving the maintenance cost. Real-time monitoring and report generation: the image and the position information of the electric device can be acquired in real time by the patrol inspection by the unmanned aerial vehicle, and the analysis situations such as the defect, damage and corrosion of the electric device can be obtained in time through the image processing and analysis of the ground station. The patrol inspection electronic report is generated based on these analysis results, and the service life, maintenance expense, maintenance measure and other information of the electric device are provided, thus providing guidance and decision basis to the maintenance personnel.

In conclusion, adopting the unmanned aerial vehicle for the electric device patrol inspection in this embodiment may improve the patrol inspection efficiency and accuracy, improve the patrol inspection safety, save costs and achieve the real-time monitoring and report generation, which is of great significance to maintain and manage the electric device.

In this embodiment, many issues existing in the traditional electric patrol inspection method can be solved by the electric patrol inspection system based on the unmanned aerial vehicle, the patrol inspection efficiency, accuracy and safety are improved, and a better means is provided for the maintenance and management of the electric device. Including: low efficiency of manual patrol inspection: the traditional electric patrol inspection requires the personnel to arrive at the site for patrol inspection, which consumes time and has a relatively high human cost. However, the patrol inspection by the unmanned aerial vehicle can cover a large area quickly through an aircraft, thus completing the patrol inspection task efficiently and reducing the human and time costs. Difficult to guarantee the patrol inspection accuracy: the traditional electric patrol inspection method may lead to the missing inspection, erroneous judgment and other issues due to personnel negligence or subjective factors. However, the patrol inspection by the unmanned aerial vehicle can perform all-round scanning on the electric device through sensors such as a high-definition image and video and an infrared thermal imaging technology, so as to accurately catch exceptions and improve the patrol inspection accuracy. Relatively great security risk: the traditional electric patrol inspection method requires the personnel to enter the dangerous area around the high-voltage electric device for patrol inspection, thus existing a certain security risk. However, the patrol inspection by the unmanned aerial vehicle can perform the patrol inspection on the electric device by remotely controlling the aircraft, to ensure the safety of the operator. Difficult to meet the requirement of real-time monitoring: the traditional electric patrol inspection method requires to process the collected data after collection, and does not meet the real-time monitoring requirement. However, the patrol inspection by the unmanned aerial vehicle can perform real-time processing and analysis in a manner that the aircraft uploads the data to a cloud, such that the state of the electric device can be fed back to the manager in time, thereby improving the monitoring effect.

In this embodiment, the electric patrol inspection system based on the unmanned aerial vehicle can improve the patrol inspection efficiency and accuracy, and reduce the patrol inspection cost and risk. As a novel mobile platform, the unmanned aerial vehicle has better maneuverability and observation capability, can reach the place requiring the patrol inspection quickly, and collect the data and image information more completely. At the same time, the unmanned aerial vehicle can also avoid safety issues in a vertical direction of the construction area, thus effectively protect the safety of workers. The electric patrol inspection system based on the unmanned aerial vehicle mainly includes technologies such as the unmanned aerial vehicle, image processing and computation and data storage and transmission; and the unmanned aerial vehicle equipped with the high-definition camera, thermal camera, laser radar and other devices can achieve quick patrol inspection, exception detection, positioning and other functions of the power facilities. The collected image data is analyzed through the image processing technology, which can discover the defect, damage, corrosion and other situations of the device, predict the service life and maintenance expense of the device, generate the patrol inspection report in time, and improve the reliability and safety of the device.

Embodiment 2: as shown in FIG. 2, on the basis of Embodiment 1, the embodiment of the present disclosure provides a process of formulating a flight path for an electric patrol inspection area, including the following steps of:

S101: acquiring an electric device distribution map in the electric patrol inspection area, and at the same time acquiring position coordinates of various electric devices, where the position coordinates are the position information, the plurality of electric devices are divided into a plurality of flight path nodes according to the different position information, and the flight path nodes including the position information constitute a training trajectory dataset;

S102: inputting the training trajectory dataset to a flight path generation model, to generate a flight path in real time, and inputting the flight path to a controller of the unmanned aerial vehicle; and S103: minimizing time that the unmanned aerial vehicle completes the specified electric patrol inspection area in combination with wireless transmission power and the flight path of the unmanned aerial vehicle; and performing a trial flight on the unmanned aerial vehicle according to the flight path, to check the time.

The above-mentioned technical solution has the following working principles and beneficial effects: in this embodiment, first the electric device distribution map in the electric patrol inspection area is acquired, at the same time the position coordinates of the various electric devices are acquired, the position coordinates are the position information, the plurality of electric devices are divided into a plurality of flight path nodes according to the different position information, and the flight path nodes including the position information constitute the training trajectory dataset; then the training trajectory dataset is input to the flight path generation model, to obtain the flight path generation model and generate the flight path in real time, and the flight path is input to the controller of the unmanned aerial vehicle; and finally, the time that the unmanned aerial vehicle completes the specified electric patrol inspection area is minimized in combination with the wireless transmission power and the flight path of the unmanned aerial vehicle, and the trial flight is performed on the unmanned aerial vehicle according to the flight path, to check the time. Patrol inspection path optimized by the above-mentioned solution: the electric device may be divided into the plurality of flight path nodes by acquiring the electric device distribution map and position coordinates, and the plurality of flight path nodes serve as the training trajectory dataset to be input to the flight path generation model; and the generated flight path can be optimized according to the position information of the electric device, such that the unmanned aerial vehicle can pass through each electric device, cover the overall patrol inspection area and maximally reduce the situations of missing inspection and repeat inspection during patrol inspection, thus optimizing the patrol inspection path and improving the patrol inspection efficiency. Automatic patrol inspection: for the trajectory generated by the flight path generation model, the unmanned aerial vehicle can perform patrol inspection according to the assigned flight route, and manual intervention is not required, thus achieving automatic patrol inspection, reducing the need of human resources, and saving time and costs. Minimize the patrol inspection time: the flight route and speed of the unmanned aerial vehicle can be optimized by combining the wireless transmission power and flight path of the unmanned aerial vehicle and minimizing the time that the unmanned aerial vehicle completes the specified electric patrol inspection area, thus minimizing the patrol inspection time under a premise of guaranteeing the comprehensive patrol inspection; and the patrol inspection efficiency can be improved, the consumption of the patrol inspection time is reduced. The significance of setting the flight path node based on the position coordinates lies in: ensure the coverage: setting the flight path node based on the position coordinates of the electric device can ensure that the unmanned aerial vehicle can pass through each electric device during the patrol inspection, to cover the overall patrol inspection area and avoid missing inspection. Optimize the route: by dividing the electric device into a plurality of nodes, the flight route of the unmanned aerial vehicle can be optimized according to the position information, thus maximally reducing the situations of repeat inspection and missing inspection, and improving the patrol inspection efficiency. Management and analysis: as key information, the position coordinates may help distribute the electric device and manage and analyze the patrol inspection situation, such as generating the patrol inspection report and counting the device state, thus providing reference basis for subsequent maintenance and management.

In conclusion, in this embodiment, setting the flight path node based on the position coordinates can optimize the patrol inspection route, implement the automatic patrol inspection, minimize the patrol inspection time, and provide basic data for the management and analysis of the electric device.

Embodiment 3: as shown in FIG. 3, on the basis of Embodiment 2, the embodiment of the present disclosure provides a process of generating a flight path, including the following steps of:

S1021: continuing a plurality of flight path nodes to obtain a flight route of the adjacent flight path nodes, dividing the flight route into a plurality of grids, and constructing a flight path background field including the plurality of grids;

S1022: acquiring, by a laser radar, geographical environment data of an electric patrol inspection area, preprocessing the geographical environment data, constructing a geographical environment background field of the electric patrol inspection area, and dividing the geographical environment background field into a plurality of grids; and S1023: merging the grids of the flight path background field with the grids of the geographical environment background field to form a grid matrix, judging a significance of a flight direction of the unmanned aerial vehicle based on the grids in the grid matrix, and confirming whether fly-around is required or not in the current geographical environment.

The above-mentioned technical solution has the following working principles and beneficial effects: in this embodiment, first the plurality of flight path nodes are continued to obtain the flight route of the adjacent flight path nodes, the flight route is divided into the plurality of grids, and the flight path background field including the plurality of grids is constructed; then the geographical environment data of the electric patrol inspection area is acquired by the laser radar, the geographical environment data is preprocessed, the geographical environment background field of the electric patrol inspection area is constructed, and the geographical environment background field is divided into the plurality of grids; and finally the grids of the flight path background field are merged with the grids of the geographical environment background field to form the grid matrix, the significance of the flight direction of the unmanned aerial vehicle is judged based on the grids in the grid matrix, and whether fly-around is required or not in the current geographical environment is confirmed. Determine the flight direction by the above-mentioned solution: the flight path background field is merged with the geographical environment background field to form the grid matrix, and the significance of the flight direction of the unmanned aerial vehicle is judged based on the grid matrix, which can help the unmanned aerial vehicle determine the best flight direction, avoid colliding with obstacles in the geographical environment, and ensure the safety of the patrol inspection. Optimize the flight route: the flight route can be optimized based on the geographical environment data in the patrol inspection area by combining the flight path background field with the geographical environment background field; and which geographical environments requiring fly-around can be determined through the analysis of the grid matrix, thus avoiding the unmanned aerial vehicle colliding with the obstacles in the geographical environment, and improving the efficiency and accuracy of the patrol inspection. Improve the safety and obstacle avoidance capacity: combining the geographical environment data with the flight path background field may help the unmanned aerial vehicle identify and avoid a potential collision risk during patrol inspection; and by judging the significance of the flight direction, the unmanned aerial vehicle can perform adjustments and avoidance according to the obstacles in the geographical environment, so as to improve the safety and obstacle avoidance capacity of the patrol inspection. Improve the patrol inspection efficiency: the flight efficiency of the unmanned aerial vehicle can be improved by optimizing the flight route and avoiding invalid fly-around; and the unmanned aerial vehicle may inspect the target area more quickly, to reduce the patrol inspection time and cost and improve the patrol inspection efficiency.

In conclusion, in this embodiment, the solution of the geographical environment data and the flight path background field can help the unmanned aerial vehicle determine the best flight direction, optimize the flight route, improve the safety and obstacle avoidance capacity and improve the patrol inspection efficiency, which is of great significance for the safety, accuracy and efficiency of the electric patrol inspection.

Embodiment 4: as shown in FIG. 4, on the basis of Embodiment 1, the embodiment of the present disclosure provides a process of a wireless transmission image and position information, including the following steps of:

S104: presetting a wireless transmission power enhanced program on a controller of an unmanned aerial vehicle, where a triggering condition of the wireless transmission power enhanced program is that wireless transmission power of a flight path node of the current unmanned aerial vehicle exceeds a maximum transmission distance from the current unmanned aerial vehicle to a ground station;

S105: determining, by the unmanned aerial vehicle, a wireless transmission distance from the flight path node to the ground station in real time, where the triggering condition is started when the flight is performed according to the flight path and the controller predicts that the next flight path node is about to exceed the maximum transmission distance and flies away the current flight path node; and S106: starting, by the controller, the wireless transmission power enhanced program according to the triggering condition, and transmitting image and position information collected by the unmanned aerial vehicle in a new wireless transmission power of the wireless transmission power enhanced program.

The above-mentioned technical solution has the following working principles and beneficial effects: in this embodiment, first the controller of the unmanned aerial vehicle presets the wireless transmission power enhanced program, and the triggering condition of the wireless transmission power enhanced program is that the wireless transmission power of the flight path node of the current unmanned aerial vehicle exceeds the maximum transmission distance from the current unmanned aerial vehicle to the ground station; then the unmanned aerial vehicle determines the wireless transmission distance from the flight path node to the ground station in real time, and the triggering condition is started when the flight is performed according to the flight path and the controller predicts that the next flight path node is about to exceed the maximum transmission distance and flies away the current flight path node; and finally the controller starts the wireless transmission power enhanced program according to the triggering condition, and the image and the position information collected by the unmanned aerial vehicle are transmitted in the new wireless transmission power of the wireless transmission power enhanced program. The significance of the above-mentioned solution is mainly reflected in the following aspects: ensure the data transmission reliability: by presetting the wireless transmission power enhanced program, the controller starts the wireless transmission power enhanced program when the wireless transmission power of the flight path node of the unmanned aerial vehicle exceeds the maximum transmission distance from the current unmanned aerial vehicle to the ground station; when a limited wireless transmission scope is reached, the transmission reliability of the data is still ensured; and enhancing the wireless transmission power can enlarge the transmission distance and avoid the interruption of data transmission or the decrease of signal quality. Improve the communication stability: the wireless transmission distance from the flight path node to the ground station is measured in real time, and whether or not the next flight path node will exceed the maximum transmission distance is predicted according to the flight path; when predicting that the next node may exceed the transmission distance, the triggering condition is started, and the controller starts the wireless transmission power enhanced program; and the transmission power may be adjusted in time, to keep the communication stability and avoid the data transmission problem caused by weak or interrupted signals. Improve the data transmission efficiency: the significance of the wireless transmission power enhanced program lies in that the data transmission efficiency may be improved by enhancing the wireless transmission power; and after the transmission power is enhanced, the signal intensity is increased, to improve the data transmission rate and stability and reduce the transmission delay, thus quickening the data transmission speed and improving the timeliness of the image and the position information collected by the unmanned aerial vehicle. Ensure the data integrity: enchanting the wireless transmission power may reduce a situation of losing or damaging the data package during the data transmission, to ensure the data integrity; and errors occurred during the data transmission may be avoided, to ensure the correct the image and the position information transmitted.

In conclusion, in this embodiment, presetting the wireless transmission power enhanced program may ensure the reliability, stability and efficiency of the data transmission; and enhancing the wireless transmission power may enlarge the transmission distance, improve the communication stability, quicken the data transmission rate and ensure the data integrity and accuracy, which is of great significant to the data transmission of the patrol inspection by the unmanned aerial vehicle.

Embodiment 5: as shown in FIG. 5, on the basis of Embodiment 1, the embodiment of the present disclosure provides a process of processing and analyzing an image, including the following steps of:

S201: preprocessing a received image, where the preprocessing includes operations of image denoising, enhancing a contrast ratio and adjusting a brightness, an electric device in the image is subjected to object detection and segmentation, to identify and position a position and a bounding box of the electric device;

S202: extracting a target characteristic related to a defect, damage and corrosion in a segmented electric device area, and transforming the image information into a characteristic vector capable of being quantified and analyzed, where the target characteristic includes a texture characteristic, a shape characteristic and a color characteristic; and S203: performing a defect analysis and a classification on the extracted target characteristic by using a classifier, judging the defect, damage, corrosion and other situations of the electric device according to the characteristic vector, and giving a corresponding judgment result.

The above-mentioned technical solution has the following working principles and beneficial effects: in this embodiment, first the received image is preprocessed, the preprocessing includes operations of image denoising, enhancing a contrast ratio and adjusting a brightness, the electric device in the image is subjected to object detection and segmentation, to identify and position the position and the bounding box of the electric device; then the target characteristic related to the defect, damage and corrosion is extracted in the segmented electric device area, the image information is transformed into the characteristic vector capable of being quantified and analyzed, and the target characteristic includes the texture characteristic, shape characteristic and color characteristic, etc.; and finally the defect analysis and the classification are performed on the extracted target characteristic by using the classifier, the defect, damage, corrosion and other situations of the electric device are judged according to the characteristic vector, and the corresponding judgment result is given. Achieve the automatic analysis by the above-mentioned solution: the received image is subjected to preprocessing, object detection and segmentation and characteristic extract, so as to achieve the automatic analysis for the electric device, thus reducing the influence from manual intervention and subjective judgment, and improving the objectivity and consistency of the analysis. High efficiency and accuracy: the high efficiency processing and analysis for mass image data may be achieved by adopting image processing and machine learning technologies; the classifier uses the extracted target characteristic for defect analysis and classification, to quickly and accurately judge the defect, damage, corrosion and other situations of the electric device, thus greatly improving the efficiency and accuracy of the analysis, and saving human and time costs. Uniform standards and consistency: the extracted target characteristic is subjected to defect analysis and classification by establishing the classifier, to achieve the uniform standards and consistency for the situations of the electric device; the classifier can learn the normal state and various defect types of the electric device based on the training data, to compare the new image data with these standards and judge the specific situations of the electric device, thus avoiding the involvement of human factors, and ensuring the objectivity and consistency of the judgment result. Provide decision basis: the significance that the classifier performs the defect analysis and classification on the extracted target characteristic lies in that the decision basis may be provided. Based on the result of the classifier, the defect, damage, corrosion and other situations of the electric device can be accurately diagnosed, thus providing important reference and guidance to formulate the maintenance plan, optimize the resource allocation and improve the reliability of the electric device.

In conclusion, in this embodiment, performing preprocessing, object detection and segmentation and characteristic extraction on the image as well as performing defect analysis and classification on the classifier can achieve the automatic analysis and judgment for the electric device, thus improving the efficiency and accuracy of the analysis, ensuring the objectivity and consistency of the analysis result, providing decision basis, and improving the maintenance and management level of the electric device.

The received image is preprocessed, the preprocessing includes operations of image denoising, enhancing a contrast ratio and adjusting a brightness, the electric device in the image is subjected to object detection and segmentation, to identify and position the position and the bounding box of the electric device.

Embodiment 6: as shown in FIG. 6, on the basis of Embodiment 5, the embodiment of the present disclosure provides a process of performing object detection and segmentation on an electric device in an image, including the following steps of:

S2011: acquiring a to-be-detected image including a positive sample of the electric device, positioning and identifying the electric device in the image by using a target detection algorithm, to automatically identify the electric device in the image and give a position and a bounding box;

S2012: segmenting the electric device from a background with the bounding box as a segmentation limit according to the position and bounding box obtained through the target detection, to form a segmentation result; and S2013: adopting a negative sample of the image excluding the electric device to detect the object and assess the segmentation result.

The above-mentioned technical solution has the following working principles and beneficial effects: in this embodiment, first the to-be-detected image including the positive sample of the electric device is acquired, the electric device in the image is positioned and identified by using the target detection algorithm, to automatically identify the electric device in the image and give the position and the bounding box; then the electric device is segmented from the background with the bounding box as the segmentation limit according to the position and bounding box obtained through the target detection, to form the segmentation result; and finally the negative sample of the image excluding the electric device is adopted to detect the object and assess the segmentation result. Automatic detection and segmentation in the above-mentioned solution: using the target detection algorithm can automatically identify the electric device in the image and give the position and the bounding box, thus reducing the influence from the manual intervention and subjective judgment, and achieving the automatic detection and positioning of the electric device; and at the same time, the electric device can be segmented from the background through the object segmentation algorithm, to form the accurate segmentation result. Reduce manual labor and cost: the automatic detection and segmentation can reduce the manual labor and cost; and compared with the electric device detection and segmentation carried out by the manual method, the automatic method can quickly and accurately process mass image data and save manpower and time cost. Improve the accuracy of detection and segmentation: the electric device can be accurately positioned and identified in the image by using the target detection algorithm, and the position and the bounding box can be given; and at the same time the electric device can be segmented from the background by adopting the object segmentation algorithm, to form the accurate segmentation result, thus improving the accuracy of the detection and segmentation result, and reducing the situation of missing inspection and leakage inspection. Result assessment and optimization: the object detection and segmentation result is assessed, and the negative sample of the image excluding the electric device may be used to verify the performance of the algorithm. The accuracy rate, recall rate, Intersection-over-Union (IoU) and other indicators of the algorithm can be analyzed through the assessment result, to further optimize and improve the performance of the detection and segmentation algorithm.

In conclusion, in this embodiment, the manual labor and cost can be reduced and the accuracy of the detection and segmentation can be improved by automatically detecting and segmenting the electric device; and at the same time the performance of the algorithm can be improved continuously through the result assessment and optimization. This is of great significance to detect, position and analyze the electric device, thus improving the efficiency and accuracy for the management and maintenance of the electric device.

Embodiment 7: as shown in FIG. 7, on the basis of Embodiment 5, the embodiment of the present disclosure provides a process of extracting a target characteristic related to a defect, damage and corrosion, including the following steps of:

S2021: identifying a target characteristic of the characteristic in a segmented electric device area, extracting the target characteristic of a segmented to-be-identified electric device image and a segmented preset electric device image, to obtain a plurality of characteristic vectors, where the characteristic vectors correspond to a texture characteristic, a shape characteristic and a color characteristic and other information of the segmented to-be-detected electric device image;

S2022: calculating a similarity of the characteristic vectors of the segmented to-be-identified electric device image and the segmented preset electric device image under the texture characteristic, shape characteristic and color characteristic of the same electric device image, to obtain a first similarity of the texture characteristic, a second similarity of the shape characteristic and a third similarity of the color characteristic, where a computed expression of the similarity $Sim(L_p, L_q)$ is $$Sim(L_p, L_q, L_s) = \frac{2\sum_{k=1}^{N}\min(i_{pk}, i_{qk}, i_{sk})}{\sum_{k=1}^{N}(i_{pk} + i_{qk} + i_{sk})};$$

$L_p$, $L_q$, $L_s$ correspond to the characteristic vectors of the texture characteristic, shape characteristic and color characteristic in respective, $i_{pk}$ represents a $k^{th}$ element of the texture characteristic vector $L_p$, $i_{qk}$ represents a $k^{th}$ element of the shape characteristic vector $L_p$, $i_{sk}$ represents a $k^{th}$ element of the color characteristic vector $L_s$, min(•) represents a function taking the minimum, N represents the number of elements in the characteristic vectors, specifically for the texture characteristic, shape characteristic and color characteristic, each element in the characteristic vectors corresponds to a certain specific quantified quantity or statistic quantity of the respective characteristic; for example, for the texture characteristic, each element possibly represents a value of a certain texture statistic indicator (e.g., contrast and capacity); for the shape characteristic, each element possibly represents a value of a certain geometrical characteristic (e.g., area and perimeter); for the color characteristic, each element possibly represents a value of a certain color attribute (e.g., the value of a certain color channel in a color histogram); and S2023: obtaining a difference of the electric device image in the texture characteristic, shape characteristic and color characteristic according to the first similarity, the second similarity and the third similarity that are obtained upon calculation, thus obtaining the change of the target characteristic related to the defect, damage and corrosion.

The above-mentioned technical solution has the following working principles and beneficial effects: in this embodiment, first the target characteristic of the characteristic in the segmented electric device area is identified, the target characteristic of the segmented to-be-identified electric device image and the segmented preset electric device image is extracted, to obtain the plurality of characteristic vectors, where the characteristic vectors correspond to the texture characteristic, shape characteristic and color characteristic and other information of the segmented to-be-detected electric device image; then the similarity of the characteristic vectors of the segmented to-be-identified electric device image and the segmented preset electric device image under the texture characteristic, shape characteristic and color characteristic of the same electric device image is calculated, to obtain the first similarity of the texture characteristic, the second similarity of the shape characteristic and the third similarity of the color characteristic; and finally the difference of the electric device image in the texture characteristic, shape characteristic and color characteristic is obtained according to the first similarity, the second similarity and the third similarity that are obtained upon calculation, thus obtaining the change of the target characteristic related to the defect, damage and corrosion. Characteristic extraction and similarity calculation in the above-mentioned solution: the target characteristic such as the texture characteristic, shape characteristic and color characteristic of the segmented to-be-identified electric device image and the segmented preset electric device image is extracted, and their similarity is calculated to quantify the characteristic difference between every two characteristics, thus helping identify and analyze the defect, damage, corrosion and other issues of the electric device, and providing quantitative information about the electric device situation. Difference analysis and characteristic change: the differences of the electric device image in terms of the texture characteristic, shape characteristic and color characteristic can be obtained by the similarity obtained upon calculation; these differences can reflect the characteristic change of the defect, damage, corrosion and other issues of the electric device; and analyzing these characteristic change can help judge the health situation of the electric device, predict the potential issues and provide guidance and basis for maintenance and repairing work. Automatic identification and analysis: the automatic identification and analysis of the target characteristic in the electric device image can be achieved through the automatic characteristic extraction and similarity calculation, thus reducing the influence from manual intervention and subjective judgment, and improving the objectivity and consistency of the analysis. At the same time, the automatic identification and analysis can process mass image data quickly and improve the analysis efficiency. Provide decision basis: the decision basis can be provided by analyzing the differences of the electric device image in terms of the texture characteristic, shape characteristic and color characteristic; the change of these characteristics can help judge the severity and type of the defect, damage, corrosion and other issues of the electric device; and based on these information, the corresponding maintenance plan can be formulated, the resource allocation can be optimized, and the corresponding repairing measures can be taken, thus improving the reliability and safety of the electric device.

In conclusion, in this embodiment, the difference of the target characteristics in the electric device image can be quantified through characteristic extraction and similarity calculation, thus providing the change of the target characteristics related to the defect, damage and corrosion. This is of great significance to the identification, analysis and decision of the electric device, so as to improve the maintenance and management level of the electric device and reduce the potential risk.

Embodiment 8: as shown in FIG. 8, on the basis of Embodiment 1, the embodiment of the present disclosure provides a process of generating a patrol inspection electronic report, including the following steps of:

S301: receiving a result of an analysis situation of a ground station, where the ground station sends a request of generating the patrol inspection electronic report, the request of the patrol inspection electronic report includes an electric report identifier and position information; and acquiring an electronic report template corresponding to the electric device with the corresponding position information, and confirming items included in the patrol inspection electronic report;

S302: confirming a basic parameter and a global parameter of the patrol inspection electronic report according to the items, where the basic parameter refers to a parameter for defining a basic content of the patrol inspection electronic report, and the global parameter refers to a normal parameter of the electric device quoted in the patrol inspection electronic report; and S303: generating a root node of the patrol inspection electronic report based on an interface that the basic parameter is on the patrol inspection electronic report, a title of the root node being the name of the electric device corresponding to the position information, adding a child node instruction in response to the root node, and unifying, by a child node, the result of the analysis situation of the electric device.

The above-mentioned technical solution has the following working principles and beneficial effects: in this embodiment, first the result of the analysis situation of the ground station is received, the ground station sends the request of generating the patrol inspection electronic report, the request of the patrol inspection electronic report includes the electric report identifier and position information; and the electronic report template corresponding to the electric device with the corresponding position information is acquired, and the items included in the patrol inspection electronic report are confirmed; then the basic parameter and the global parameter of the patrol inspection electronic report are confirmed according to the items, the basic parameter refers to the parameter for defining the basic content of the patrol inspection electronic report, and the global parameter refers to the normal parameter of the electric device quoted in the patrol inspection electronic report; and finally the root node of the patrol inspection electronic report is generated based on the interface that the basic parameter is on the patrol inspection electronic report, the title of the root node is the name of the electric device corresponding to the position information, the child node instruction is added in response to the root node, and the child node unifies the result of the analysis situation of the electric device. Automatic report generation of the above-mentioned solution: the patrol inspection electronic report is generated automatically by receiving the result of the analysis situation of the ground station and according to the position information and electronic report template in the electric report request, so as to reduce the workload and time that a worker compiles the report, and to improve the efficiency and accuracy of the report generation. Standardized report content: confirming the items and parameters included in the patrol inspection electronic report can ensure that the report content is consistent with the requirement and standard, and the consistent report content can be provided, facilitating the subsequent analysis, comparison and decision. Information concentration and visualization: the decentralized analysis situation result can be intensively shown in the report by generating the root node and the child node of the patrol inspection electronic report, facilitating user's viewing and reading; and at the same time a visualized method is provided to present the analysis result, enabling the information to be more intuitive and easy to understand. Provide the decision basis: the patrol inspection electronic report includes the analysis situation result and parameter information of the electric device. Based on these information, the basis can be provided for the subsequent maintenance and management decision; for example, the corresponding maintenance plan and preventive maintenance measure can be formulated according to the exception result in the report, to improve the reliability and safety of the electric device. Data traceability and archiving: the result of the analysis situation and the parameter information of the electric device can be recorded by generating the patrol inspection electronic report, and associated with the specific position information, facilitating the future inquiry, traceability and archiving, and providing the support for long-term maintenance and management of the electric device.

In conclusion, in this embodiment, the process of generating the patrol inspection electronic report has the significance of improving the efficiency, providing the decision basis and facilitating the data management through the automatic report generation, standardized report content and information visualization. This helps improve the maintenance and management process of the electric device, and improve the reliability and safety of the electric device.

Figure 9:
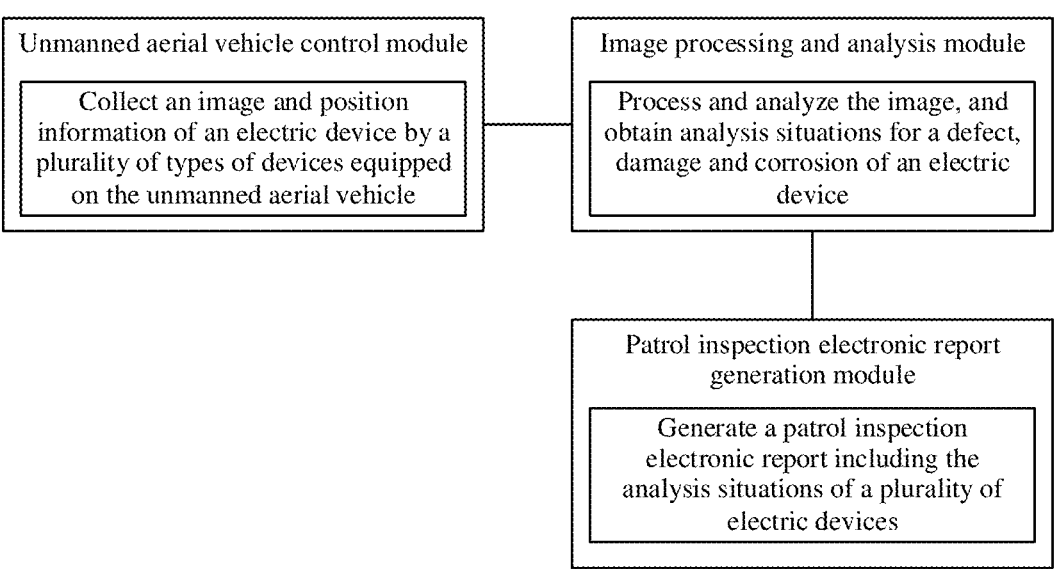
FIG. 9 is a block diagram of an electric patrol inspection control system based on an unmanned aerial vehicle in Embodiment 9 of the present disclosure.

Embodiment 9: as shown in FIG. 9, on the basis of Embodiments 1-8, the embodiment of the present disclosure provides an electric patrol inspection control system based on an unmanned aerial vehicle, including:

an unmanned aerial vehicle control module, configured to formulate a flight path according to an electric patrol inspection area, and to collect an image and position information of an electric device by a plurality of types of devices equipped on the unmanned aerial vehicle, where the image and the position information are transmitted to a receiving terminal of a ground station in a form of wireless transmission;

an image processing and analyzing module, configured to receive the real-time collected image and position information by the ground station, to process and analyze the image, and then to obtain analysis on defects, damages and corrosion of the electric device; and a patrol and examine electronic reports generation module, configured to generate a patrol inspection electronic report including the analysis situations of a plurality of electric devices according to the analysis situation of the ground station and the position information as a distinguishing characteristic, to give the service life, maintenance expense, maintenance measure of the electric device at the same time according to the patrol inspection electronic report, and to inform maintenance personnel of the position information of the electric device.

The above-mentioned technical solution has the following working principles and beneficial effects: in this embodiment, the unmanned aerial vehicle control module is configured to formulate the flight path according to the electric patrol inspection area, and to collect the image and the position information of the electric device by the plurality of types of devices equipped on the unmanned aerial vehicle, the image and the position information are transmitted to the receiving terminal of the ground station in a form of wireless transmission; the image processing and analysis module is configured to receive the real-time collected image and position information by the ground station, to process and analyze the image, and then to obtain analysis situations for the defect, damage and corrosion of the electric device; and the patrol and examine electronic reports generation module is configured to generate the patrol inspection electronic report including the analysis situations of the plurality of electric devices according to the analysis situation of the ground station and the position information as the distinguishing characteristic, the service life, maintenance expense, maintenance measure of the electric device are given at the same time according to the patrol inspection electronic report, and the maintenance personnel are informed of the position information of the electric device. The significance that the above-mentioned solution adopts the unmanned aerial vehicle for electric device patrol inspection is mainly reflected in the following aspects: improve the efficiency and accuracy: the patrol inspection performed by the unmanned aerial vehicle may implement the quick, efficient and complete inspection for the electric device. The unmanned aerial vehicle can cover a great area of patrol inspection area in a relatively short time, thus reducing the need for human resources and the patrol inspection time. Meanwhile, the plurality of devices equipped on the unmanned aerial vehicle can collect high-definition images and position information, and the defect, damage, corrosion and other issues of the electric device can be accurately identified through the image processing and analysis algorithm, thus improving the accuracy of the patrol inspection. Improve the safety: the traditional electric device requires the personnel to enter the high-voltage and dangerous working environment for the patrol inspection, thus existing a safety risk. However, the patrol inspection by the unmanned aerial vehicle can avoid the direct contact between the personnel and a high-voltage device, so as to reduce the personal safety risk. At the same time, the unmanned aerial vehicle can fly under complicated topographic conditions, and perform the patrol inspection better in places hard to reach, such as high altitudes and steep mountains, thus improving the patrol inspection safety. Save costs: compared with the traditional manual patrol inspection, the patrol inspection by the unmanned aerial vehicle can save human resources and time costs. In addition, the issues of the electric device can be discovered early in time by the patrol inspection by the unmanned aerial vehicle, so as to take the maintenance measure in advance and avoid the expansion and delay of device faults, thus reducing the maintenance expense and maintenance time, and saving the maintenance cost. Real-time monitoring and report generation: the image and the position information of the electric device can be acquired in real time by the patrol inspection by the unmanned aerial vehicle, and the analysis situations such as the defect, damage and corrosion of the electric device can be obtained in time through the image processing and analysis of the ground station. The patrol inspection electronic report is generated based on these analysis results, and the service life, maintenance expense, maintenance measure and other information of the electric device are provided, thus providing guidance and decision basis to the maintenance personnel.

In conclusion, adopting the unmanned aerial vehicle for the electric device patrol inspection in this embodiment may improve the patrol inspection efficiency and accuracy, improve the patrol inspection safety, save costs and achieve the real-time monitoring and report generation, which is of great significance to maintain and manage the electric device.

Figure 10:
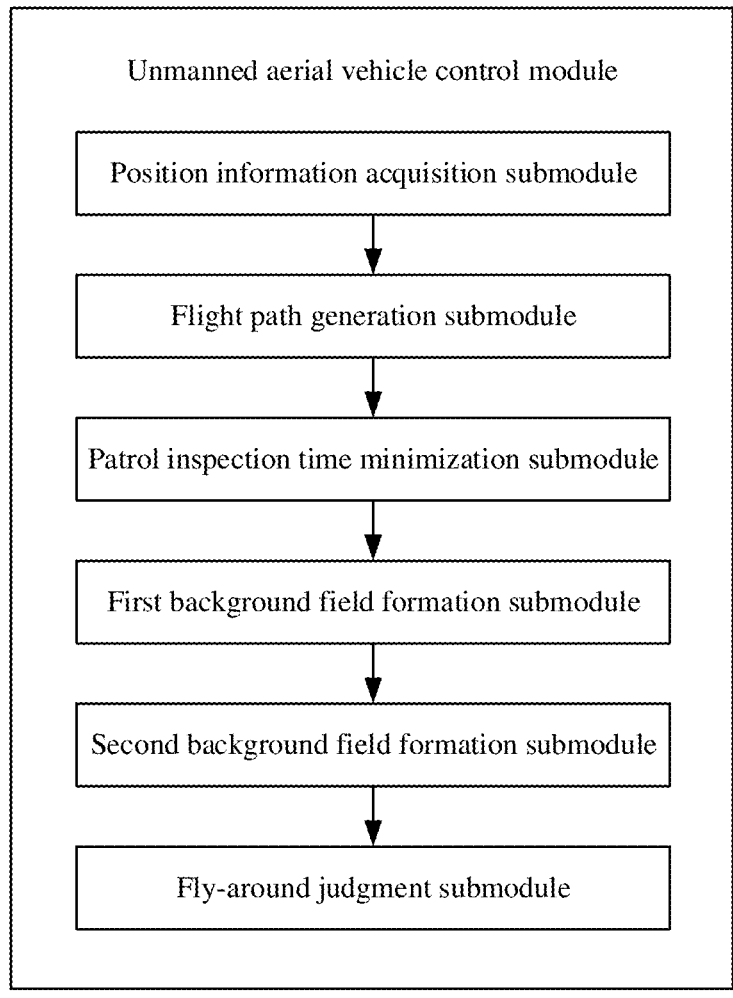
FIG. 10 is a block diagram of an unmanned aerial vehicle control module in Embodiment 10 of the present disclosure.

Embodiment 10: as shown in FIG. 10, on the basis of Embodiment 9, the embodiment of the present disclosure provides an unmanned aerial vehicle control method, including:

a position information acquisition submodule, configured to acquire an electric device distribution map in an electric patrol inspection area, and at the same time to acquire position coordinates of various electric devices, where the position coordinates are the position information, a plurality of electric devices are divided into a plurality of flight path nodes according to different position information, and the flight path nodes including the position information constitute a training trajectory dataset;

a flight path generation submodule, configured to input the training trajectory dataset to a flight path generation model, to generate a flight path in real time, and to input the flight path to a controller of the unmanned aerial vehicle;

a patrol inspection time minimization submodule, configured to minimize time that the unmanned aerial vehicle completes the specified electric patrol inspection area in combination with wireless transmission power and the flight path of the unmanned aerial vehicle, where a trial flight is performed on the unmanned aerial vehicle according to the flight path, to check the time;

a first background field formation submodule, configured to continue the plurality of flight path nodes to obtain a flight route of the adjacent flight path nodes, to divide the flight route into a plurality of grids, and to construct a flight path background field including the plurality of grids;

a second background field formation submodule, configured to acquire geographical environment data of the electric patrol inspection area by a laser radar, to preprocess the geographical environment data, to construct a geographical environment background field of the electric patrol inspection area, and to divide the geographical environment background field into a plurality of grids; and a fly-around judgment submodule, configured to merge the grids of the flight path background field with the grids of the geographical environment background field to form a grid matrix, to judge a significance of a flight direction of the unmanned aerial vehicle based on the grids in the grid matrix, and to confirm whether fly-around is required or not in the current geographical environment.

The above-mentioned technical solution has the following working principles and beneficial effects: in this embodiment, the position information acquisition submodule is configured to acquire the electric device distribution map in the electric patrol inspection area, and at the same time to acquire the position coordinates of various electric devices, the position coordinates are the position information, the plurality of electric devices are divided into the plurality of flight path nodes according to the different position information, and the flight path nodes including the position information constitute the training trajectory dataset; the flight path generation submodule is configured to input the training trajectory dataset to the flight path generation model, to generate the flight path in real time, and to input the flight path to the controller of the unmanned aerial vehicle; the patrol inspection time minimization submodule is configured to minimize time that the unmanned aerial vehicle completes the specified electric patrol inspection area in combination with the wireless transmission power and the flight path of the unmanned aerial vehicle, where the trial flight is performed on the unmanned aerial vehicle according to the flight path, to check the time; the first background field formation submodule is configured to continue the plurality of flight path nodes to obtain the flight route of the adjacent flight path nodes, to divide the flight route into the plurality of grids, and to construct the flight path background field including the plurality of grids; the second background field formation submodule is configured to acquire geographical environment data of the electric patrol inspection area by the laser radar, to preprocess the geographical environment data, to construct the geographical environment background field of the electric patrol inspection area, and to divide the geographical environment background field into the plurality of grids; and the fly-around judgment submodule is configured to merge the grids of the flight path background field with the grids of the geographical environment background field to form the grid matrix, to judge the significance of the flight direction of the unmanned aerial vehicle based on the grids in the grid matrix, and to confirm whether the fly-around is required or not in the current geographical environment.

Optimize the patrol inspection path by the above-mentioned solution: the electric device may be divided into the plurality of flight path nodes by acquiring the electric device distribution map and position coordinates, and the plurality of flight path nodes serve as the training trajectory dataset to be input to the flight path generation model; and the generated flight path can be optimized according to the position information of the electric device, such that the unmanned aerial vehicle can pass through each electric device, cover the overall patrol inspection area and maximally reduce the situations of missing inspection and repeat inspection during patrol inspection, thus optimizing the patrol inspection path and improving the patrol inspection efficiency. Automatic patrol inspection: for the path generated by the flight path generation model, the unmanned aerial vehicle can perform patrol inspection according to the assigned flight route, and manual intervention is not required, thus achieving automatic patrol inspection, reducing the need of human resources, and saving time and costs. Minimize the patrol inspection time: the flight route and speed of the unmanned aerial vehicle can be optimized by combining the wireless transmission power and flight path of the unmanned aerial vehicle and minimizing the time that the unmanned aerial vehicle completes the specified electric patrol inspection area, thus minimizing the patrol inspection time under a premise of guaranteeing the comprehensive patrol inspection; and the patrol inspection efficiency can be improved, the consumption of the patrol inspection time is reduced. The significance of setting the flight path node based on the position coordinates lies in: ensure the coverage: setting the flight path node based on the position coordinates of the electric device can ensure that the unmanned aerial vehicle can pass through each electric device during the patrol inspection, to cover the overall patrol inspection area and avoid missing inspection. Optimize the route: by dividing the electric device into a plurality of nodes, the flight route of the unmanned aerial vehicle can be optimized according to the position information, thus maximally reducing the situations of repeat inspection and missing inspection, and improving the patrol inspection efficiency. Management and analysis: as key information, the position coordinates may help distribute the electric device and manage and analyze the patrol inspection situation, such as generating the patrol inspection report and counting the device state, thus providing reference basis for subsequent maintenance and management.

Determine the flight direction by the above-mentioned solution: the flight path background field is merged with the geographical environment background field to form the grid matrix, and the significance of the flight direction of the unmanned aerial vehicle is judged based on the grid matrix, which can help the unmanned aerial vehicle determine the best flight direction, avoid colliding with obstacles in the geographical environment, and ensure the safety of the patrol inspection. Optimize the flight route: the flight route can be optimized based on the geographical environment data in the patrol inspection area by combining the flight path background field with the geographical environment background field; and which geographical environments requiring fly-around can be determined through the analysis of the grid matrix, thus avoiding the unmanned aerial vehicle colliding with the obstacles in the geographical environment, and improving the efficiency and accuracy of the patrol inspection. Improve the safety and obstacle avoidance capacity: combining the geographical environment data with the flight path background field may help the unmanned aerial vehicle identify and avoid the potential collision risk during patrol inspection; and by judging the significance of the flight direction, the unmanned aerial vehicle can perform adjustments and avoidance according to the obstacles in the geographical environment, so as to improve the safety and obstacle avoidance capacity of the patrol inspection. Improve the patrol inspection efficiency: the flight efficiency of the unmanned aerial vehicle can be improved by optimizing the flight route and avoiding invalid fly-around; and the unmanned aerial vehicle may inspect the target area more quickly, to reduce the patrol inspection time and cost and improve the patrol inspection efficiency.

In conclusion, in this embodiment, setting the flight path node based on the position coordinates can optimize the patrol inspection route, implement the automatic patrol inspection, minimize the patrol inspection time, and provide basic data for the management and analysis of the electric device. In this embodiment, the solution of the geographical environment data and the flight path background field can help the unmanned aerial vehicle determine the best flight direction, optimize the flight route, improve the safety and obstacle avoidance capacity and improve the patrol inspection efficiency, which is of great significance for the safety, accuracy and efficiency of the electric patrol inspection.

Embodiment 11: on the basis of Embodiment 9, the embodiment of the present disclosure provides an image processing and analyzing module, including:

an image preprocessing submodule, configured to preprocess a received image, where the preprocessing includes operations of image denoising, enhancing a contrast ratio and adjusting a brightness, the electric device in the image is subjected to object detection and segmentation, to identify and position a position and a bounding box of the electric device;

a characteristic vector acquisition submodule, configured to extract a target characteristic related to a defect, damage and corrosion in a segmented electric device area, and to transform the image information into a characteristic vector capable of being quantified and analyzed, where the target characteristic includes a texture characteristic, a shape characteristic and a color characteristic, etc.; and a situation judgment submodule, configured to perform a defect analysis and a classification on the extracted target characteristic by using a classifier, to judge the defect, damage, corrosion and other situations of the electric device according to the characteristic vector, and to give a corresponding judgment result.

The above-mentioned technical solution has the following working principles and beneficial effects: in this embodiment, the image preprocessing submodule is configured to preprocess the received image, the preprocessing includes operations of image denoising, enhancing the contrast ratio and adjusting the brightness, the electric device in the image is subjected to object detection and segmentation, to identify and position the position and the bounding box of the electric device; the characteristic vector acquisition submodule is configured to extract the target characteristic related to the defect, damage and corrosion in the segmented electric device area, and to transform the image information into the characteristic vector capable of being quantified and analyzed, the target characteristic includes the texture characteristic, the shape characteristic and the color characteristic, etc.; and the situation judgment submodule is configured to perform the defect analysis and the classification on the extracted target characteristic by using the classifier, to judge the defect, damage, corrosion and other situations of the electric device according to the characteristic vector, and to give the corresponding judgment result. Achieve the automatic analysis by the above-mentioned solution: the received image is subjected to preprocessing, object detection and segmentation and characteristic extract, so as to achieve the automatic analysis for the electric device, thus reducing the influence from manual intervention and subjective judgment, and improving the objectivity and consistency of the analysis. High efficiency and accuracy: the high efficiency processing and analysis for mass image data may be achieved by adopting image processing and machine learning technologies; the classifier uses the extracted target characteristic for defect analysis and classification, to quickly and accurately judge the defect, damage, corrosion and other situations of the electric device, thus greatly improving the efficiency and accuracy of the analysis, and saving manpower and time costs. Uniform standards and consistency: the extracted target characteristic is subjected to defect analysis and classification by establishing the classifier, to achieve the uniform standards and consistency for the situations of the electric device; the classifier can learn the normal state and various defect types of the electric device based on the training data, to compare the new image data with these standards and judge the specific situations of the electric device, thus avoiding the involvement of human factors, and ensuring the objectivity and consistency of the judgment result. Provide decision basis: the significance that the classifier performs the defect analysis and classification on the extracted target characteristic lies in that the decision basis may be provided. Based on the result of the classifier, the defect, damage, corrosion and other situations of the electric device can be accurately diagnosed, thus providing important reference and guidance to formulate the maintenance plan, optimize the resource allocation and improve the reliability of the electric device.

In conclusion, in this embodiment, performing the preprocessing, object detection and segmentation and characteristic extraction on the image as well as performing defect analysis and classification on the classifier can achieve the automatic analysis and judgment for the electric device, thus improving the efficiency and accuracy of the analysis, ensuring the objectivity and consistency of the analysis result, providing decision basis, and improving the maintenance and management level of the electric device.

Embodiment 12: on the basis of Embodiment 9, the embodiment of the present disclosure provides a patrol and examine electronic reports generation module, including:

a report generation request submodule, configured to receive a result of an analysis situation of a ground station, where the ground station sends a request of generating the patrol inspection electronic report, the request of the patrol inspection electronic report includes an electric report identifier and position information; and to acquire an electronic report template corresponding to the electric device with the corresponding position information, and to confirm items included in the patrol inspection electronic report;

a parameter definition submodule, configured to confirm a basic parameter and a global parameter of the patrol inspection electronic report according to the items, where the basic parameter refers to a parameter for defining a basic content of the patrol inspection electronic report, and the global parameter refers to a normal parameter of the electric device quoted in the patrol inspection electronic report; and a demarcation definition submodule, configured to generate a root node of the patrol inspection electronic report based on an interface that the basic parameter is on the patrol inspection electronic report, where a title of the root node is the name of the electric device corresponding to the position information, a child node instruction is added in response to the root node, and a child node unifies the result of the analysis situation of the electric device.

The above-mentioned technical solution has the following working principles and beneficial effects: in this embodiment, the report generation request submodule is configured to receive the result of the analysis situation of the ground station, the ground station sends the request of generating the patrol inspection electronic report, the request of the patrol inspection electronic report includes the electric report identifier and position information, to acquire the electronic report template corresponding to the electric device with the corresponding position information, and to confirm items included in the patrol inspection electronic report; the parameter definition submodule is configured to confirm the basic parameter and the global parameter of the patrol inspection electronic report according to the items, the basic parameter refers to the parameter for defining the basic content of the patrol inspection electronic report, and the global parameter refers to the normal parameter of the electric device quoted in the patrol inspection electronic report; and the demarcation definition submodule is configured to generate the root node of the patrol inspection electronic report based on the interface that the basic parameter is on the patrol inspection electronic report, the title of the root node is the name of the electric device corresponding to the position information, the child node instruction is added in response to the root node, and the child node unifies the result of the analysis situation of the electric device. The significance that the above-mentioned solution adopts the unmanned aerial vehicle for electric device patrol inspection is mainly reflected in the following aspects: improve the efficiency and accuracy: the patrol inspection performed by the unmanned aerial vehicle may implement the quick, efficient and complete inspection for the electric device. The unmanned aerial vehicle can cover a great area of patrol inspection area in a relatively short time, thus reducing the need for human resources and the patrol inspection time. Meanwhile, the plurality of devices equipped on the unmanned aerial vehicle can collect high-definition images and position information, and the defect, damage, corrosion and other issues of the electric device can be accurately identified through the image processing and analysis algorithm, thus improving the accuracy of the patrol inspection. Improve the safety: the traditional electric device requires the personnel need to enter the high-voltage and dangerous working environment for the patrol inspection, thus existing a safety risk. However, the patrol inspection by the unmanned aerial vehicle can avoid the direct contact between the personnel and a high-voltage device, so as to reduce the personal safety risk. At the same time, the unmanned aerial vehicle can fly under complicated topographic conditions, and perform the patrol inspection better in places hard to reach, such as high altitudes and steep mountains, thus improving the patrol inspection safety. Save costs: compared with the traditional manual patrol inspection, the patrol inspection by the unmanned aerial vehicle can save human resources and time costs. In addition, the issues of the electric device can be discovered early in time by the patrol inspection by the unmanned aerial vehicle, so as to take the maintenance measure in advance and avoid the expansion and delay of device faults, thus reducing the maintenance expense and maintenance time, and saving the maintenance cost. Real-time monitoring and report generation: the image and the position information of the electric device can be acquired in real time by the patrol inspection by the unmanned aerial vehicle, and the analysis situations such as the defect, damage and corrosion of the electric device can be obtained in time through the image processing and analysis of the ground station. The patrol inspection electronic report is generated based on these analysis results, and the service life, maintenance expense, maintenance measure and other information of the electric device are provided, thus providing guidance and decision basis to the maintenance personnel.

In conclusion, adopting the unmanned aerial vehicle for the electric device patrol inspection in this embodiment may improve the patrol inspection efficiency and accuracy, improve the patrol inspection safety, save costs and achieve the real-time monitoring and report generation, which is of great significance to maintain and manage the electric device.

It is apparent that those skilled in the art may make any modification and variation to the present disclosure without deviating from the spirit and scope of the present disclosure. Thus, if these modifications and variations of the present disclosure belong to the scope of the claims and equivalent technology thereof of the present disclosure, the present disclosure is intended to include these modifications and variations.

What is claimed is:

1. An electric patrol inspection control method based on an unmanned aerial vehicle, comprising the following steps of:

formulating a flight path according to an electric patrol inspection area, collecting an image and position information of an electric device by a plurality of types of devices equipped on the unmanned aerial vehicle, and transmitting the image and the position information to a receiving terminal of a ground station in a form of wireless transmission;

receiving, by the ground station, the real-time collected image and position information, processing and analyzing the image, and then obtaining analysis on defects, damages and corrosion of the electric device; and generating a patrol inspection electronic report comprising the analysis situations of a plurality of electric devices according to the analysis situation of the ground station and the position information as a distinguishing characteristic;

wherein a process of formulating the flight path for the electric patrol inspection area comprises the following steps of:

acquiring an electric device distribution map in the electric patrol inspection area, and at the same time acquiring position coordinates of various electric devices, to constitute a training trajectory dataset;

inputting the training trajectory dataset to a flight path generation model, to generate a flight path in real time, and inputting the flight path to a controller of the unmanned aerial vehicle; and minimizing time that the unmanned aerial vehicle completes the specified electric patrol inspection area in combination with wireless transmission power and the flight path of the unmanned aerial vehicle; and performing a trial flight on the unmanned aerial vehicle according to the flight path, to check the time;

wherein a process of generating the flight path comprises the following steps of:

continuing the plurality of flight path nodes to obtain a flight route of the adjacent flight path nodes, dividing the flight route into a plurality of grids, and constructing a flight path background field comprising the plurality of grids;

acquiring, by a laser radar, geographical environment data of the electric patrol inspection area, preprocessing the geographical environment data, constructing a geographical environment background field of the electric patrol inspection area, and dividing the geographical environment background field into a plurality of grids; and merging the grids of the flight path background field with the grids of the geographical environment background field to form a grid matrix, judging a significance of a flight direction of the unmanned aerial vehicle based on the grids in the grid matrix, and confirming whether fly-around is required or not in the current geographical environment;

wherein a process of processing and analyzing the image comprises the following steps of:

preprocessing the received image, wherein the preprocessing comprises operations of image denoising, enhancing a contrast ratio and adjusting a brightness, the electric device in the image is subjected to object detection and segmentation, to identify and position a position and a bounding box of the electric device;

extracting a target characteristic related to a defect, damage and corrosion in a segmented electric device area, and transforming the image information into a characteristic vector capable of being quantified and analyzed, wherein the target characteristic comprises a texture characteristic, a shape characteristic and a color characteristic;

performing a defect analysis and a classification on the extracted target characteristic by using a classifier, judging the defect, damage, corrosion and other situations of the electric device according to the characteristic vector, and giving a corresponding judgment result;

wherein a process of extracting the target characteristic related to the defect, damage and corrosion comprises the following steps of:

identifying a target characteristic of the characteristic in the segmented electric device area, extracting the target characteristic of a segmented to-be-identified electric device image and a segmented preset electric device image, to obtain a plurality of characteristic vectors, wherein the characteristic vectors correspond to texture characteristic, shape characteristic and color characteristic information of the segmented to-be-detected electric device image;

calculating a similarity of the characteristic vectors of the segmented to-be-identified electric device image and the segmented preset electric device image under the texture characteristic, shape characteristic and color characteristic of the same electric device image, to obtain a first similarity of the texture similarity, a second similarity of the shape similarity and a third similarity of the color similarity, wherein a computed expression of the similarity $\text{Sim}(L_p, L_q)$ is $$\text{Sim}(L_p, L_q, L_s) = \frac{2\sum_{k=1}^{N} \min(i_{pk}, i_{qk}, i_{sk})}{\sum_{k=1}^{N} (i_{pk} + i_{qk} + i_{sk})};$$

wherein $L_p$, $L_q$, $L_s$ correspond to the characteristic vectors of the texture characteristic, shape characteristic and color characteristic in respective, $i_{pk}$ represents a $k^{th}$ element of the texture characteristic vector $L_p$, $i_{qk}$ represents a $k^{th}$ element of the shape characteristic vector $L_p$, $i_{sk}$ represents a $k^{th}$ element of the color characteristic vector $L_s$, $\min(\bullet)$ represents a function taking the minimum, N represents the number of elements in the characteristic vectors, specifically for the texture characteristic, shape characteristic and color characteristic, each element in the characteristic vectors corresponds to a certain specific quantified quantity or statistic quantity of the respective characteristic; for the texture characteristic, each element possibly represents a value of a certain texture statistic indicator; for the shape characteristic, each element possibly represents a value of a certain geometrical characteristic; and for the color characteristic, each element possibly represents a value of a certain color attribute; and obtaining a difference of the electric device image in the texture characteristic, shape characteristic and color characteristic according to the first similarity, the second similarity and the third similarity that are obtained upon calculation, thus obtaining the change of the target characteristic related to the defect, damage and corrosion.

2. The electric patrol inspection control method based on the unmanned aerial vehicle according to claim 1, wherein the device comprises a high-definition camera, a thermal camera and a laser radar.

3. The electric patrol inspection control method based on the unmanned aerial vehicle according to claim 1, wherein the position coordinates are the position information, the plurality of electric devices are divided into a plurality of flight path nodes according to the different position information, and the flight path nodes comprising the position information constitute the training trajectory dataset.

4. The electric patrol inspection control method based on the unmanned aerial vehicle according to claim 1, wherein a process of generating the patrol inspection electronic report comprises the following steps of:

receiving a result of the analysis situation of the ground station, sending, by the ground station, a request of generating the patrol inspection electronic report, acquiring an electronic report template corresponding to the electric device with the corresponding position information, and confirming items comprised in the patrol inspection electronic report, wherein the request of the patrol inspection electronic report comprises an electric report identifier and position information;

confirming a basic parameter and a global parameter of the patrol inspection electronic report according to the items, wherein the basic parameter refers to a parameter for defining a basic content of the patrol inspection electronic report, and the global parameter refers to a normal parameter of the electric device quoted in the patrol inspection electronic report; and generating a root node of the patrol inspection electronic report based on an interface that the basic parameter is on the patrol inspection electronic report, a title of the root node being the name of the electric device corresponding to the position information, adding a child node instruction in response to the root node, and unifying, by a child node, the result of the analysis situation of the electric device.

5. The electric patrol inspection control method based on the unmanned aerial vehicle according to claim 4, wherein the service life, maintenance expense, maintenance measure of the electric device are given at the same time according to the patrol inspection electronic report, and maintenance personnel are informed of the position information of the electric device.

6. An electric patrol inspection control system based on an unmanned aerial vehicle, comprising:

an unmanned aerial vehicle control module, configured to formulate a flight path according to an electric patrol inspection area, and to collect an image and position information of an electric device by a plurality of types of devices equipped on the unmanned aerial vehicle, wherein the image and the position information are transmitted to a receiving terminal of a ground station in a form of wireless transmission;

an image processing and analyzing module, configured to receive the real-time collected image and position information by the ground station, to process and analyze the image, and then to obtain analysis on defects, damages and corrosion of the electric device; and a patrol and examine electronic reports generation module, configured to generate a patrol inspection electronic report comprising the analysis situations of a plurality of electric devices according to the analysis situation of the ground station and the position information as a distinguishing characteristic, to give the service life, maintenance expense, maintenance measure of the electric device at the same time according to the patrol inspection electronic report, and to inform maintenance personnel of the position information of the electric device;

wherein the unmanned aerial vehicle control module comprises:

a position information acquisition submodule, configured to acquire an electric device distribution map in the electric patrol inspection area, and at the same time to acquire position coordinates of various electric devices, wherein the position coordinates are the position information, the plurality of electric devices are divided into a plurality of flight path nodes according to the different position information, and the flight path nodes comprising the position information constitute a training trajectory dataset;

a flight path generation submodule, configured to input the training trajectory dataset to a flight path generation model, to generate a flight path in real time, and to input the flight path to a controller of the unmanned aerial vehicle;

a patrol inspection time minimization submodule, configured to minimize time that the unmanned aerial vehicle completes the specified electric patrol inspection area in combination with wireless transmission power and the flight path of the unmanned aerial vehicle, wherein a trial flight is performed on the unmanned aerial vehicle according to the flight path, to check the time;

a first background field formation submodule, configured to continue the plurality of flight path nodes to obtain a flight route of the adjacent flight path nodes, to divide the flight route into a plurality of grids, and to construct a flight path background field comprising the plurality of grids;

a second background field formation submodule, configured to acquire geographical environment data of the electric patrol inspection area by the laser radar, to preprocess the geographical environment data, to construct a geographical environment background field of the electric patrol inspection area, and to divide the geographical environment background field into a plurality of grids; and a fly-around judgment submodule, configured to merge the grids of the flight path background field with the grids of the geographical environment background field to form a grid matrix, to judge a significance of a flight direction of the unmanned aerial vehicle based on the grids in the grid matrix, and to confirm whether fly-around is required or not in the current geographical environment;

wherein the image processing and analysis module comprises:

an image preprocessing submodule, configured to preprocess the received image, wherein the preprocessing comprises operations of image denoising, enhancing a contrast ratio and adjusting a brightness, the electric device in the image is subjected to object detection and segmentation, to identify and position a position and a bounding box of the electric device;

a characteristic vector acquisition submodule, configured to extract a target characteristic related to a defect, damage and corrosion in a segmented electric device area, and to transform the image information into a characteristic vector capable of being quantified and analyzed, wherein the target characteristic comprises a texture characteristic, a shape characteristic and a color characteristic;

a situation judgment submodule, configured to perform a defect analysis and a classification on the extracted target characteristic by using a classifier, to judge the defect, damage and corrosion situations of the electric device according to the characteristic vector, and to give a corresponding judgment result;

wherein extracting the target characteristic related to the defect, damage and corrosion from the characteristic vector acquisition submodule comprises:

identifying the target characteristic of the characteristic in the segmented electric device area, extracting the target characteristic of a segmented to-be-identified electric device image and a segmented preset electric device image, to obtain a plurality of characteristic vectors, wherein the characteristic vectors correspond to texture characteristic, shape characteristic and color characteristic information of the segmented to-be-detected electric device image;

calculating a similarity of the characteristic vectors of the segmented to-be-identified electric device image and the segmented preset electric device image under the texture characteristic, shape characteristic and color characteristic of the same electric device image, to obtain a first similarity of the texture similarity, a second similarity of the shape similarity and a third similarity of the color similarity, wherein a computed expression of the similarity $Sim(L_p, L_q)$ is $$Sim(L_p, L_q, L_s) = \frac{2\sum_{k=1}^{N} \min(i_{pk}, i_{qk}, i_{sk})}{\sum_{k=1}^{N}(i_{pk} + i_{qk} + i_{sk})};$$

wherein $L_p$, $L_q$, $L_s$ correspond to the characteristic vectors of the texture characteristic, shape characteristic and color characteristic in respective, $i_{pk}$ represents a $k^{th}$ element of the texture characteristic vector $L_p$, $i_{qk}$ represents a $k^{th}$ element of the shape characteristic vector $L_p$, $i_{sk}$ represents a $k^{th}$ element of the color characteristic vector $L_s$, $\min(\bullet)$ represents a function taking the minimum, N represents the number of elements in the characteristic vectors, specifically for the texture characteristic, shape characteristic and color characteristic, each element in the characteristic vectors corresponds to a certain specific quantified quantity or statistic quantity of the respective characteristic; for the texture characteristic, each element possibly represents a value of a certain texture statistic indicator; for the shape characteristic, each element possibly represents a value of a certain geometrical characteristic; and for the color characteristic, each element possibly represents a value of a certain color attribute; and obtaining a difference of the electric device image in the texture characteristic, shape characteristic and color characteristic according to the first similarity, the second similarity and the third similarity that are obtained upon calculation, thus obtaining the change of the target characteristic related to the defect, damage and corrosion.

7. The electric patrol inspection control system based on the unmanned aerial vehicle according to claim 6, wherein the patrol and examine electronic reports generation module comprises:

a report generation request submodule, configured to receive a result of the analysis situation of the ground station, wherein the ground station sends a request of generating the patrol inspection electronic report, the request of the patrol inspection electronic report comprises an electric report identifier and position information; and to acquire an electronic report template corresponding to the electric device with the corresponding position information, and to confirm items comprised in the patrol inspection electronic report;

a parameter definition submodule, configured to confirm a basic parameter and a global parameter of the patrol inspection electronic report according to the items, wherein the basic parameter refers to a parameter for defining a basic content of the patrol inspection electronic report, and the global parameter refers to a normal parameter of the electric device quoted in the patrol inspection electronic report; and a demarcation definition submodule, configured to generate a root node of the patrol inspection electronic report based on an interface that the basic parameter is on the patrol inspection electronic report, wherein a title of the root node is the name of the electric device corresponding to the position information, a child node instruction is added in response to the root node, and a child node unifies the result of the analysis situation of the electric device.

* * * * *